US011691212B2

(12) United States Patent
Ide

(10) Patent No.: US 11,691,212 B2
(45) Date of Patent: Jul. 4, 2023

(54) ARC WELDING APPARATUS AND ARC WELDING METHOD

(71) Applicant: DAIHEN CORPORATION, Osaka (JP)

(72) Inventor: Akihiro Ide, Osaka (JP)

(73) Assignee: DAIHEN Corporation, Osaka (JP)

(*) Notice: Subject to any disclaimer, the term of this patent is extended or adjusted under 35 U.S.C. 154(b) by 783 days.

(21) Appl. No.: 15/762,173

(22) PCT Filed: Sep. 30, 2016

(86) PCT No.: PCT/JP2016/079032
§ 371 (c)(1),
(2) Date: Mar. 22, 2018

(87) PCT Pub. No.: WO2017/057683
PCT Pub. Date: Apr. 6, 2017

(65) Prior Publication Data
US 2018/0264576 A1 Sep. 20, 2018

(30) Foreign Application Priority Data

Sep. 30, 2015 (JP) .................. 2015-192934
Oct. 29, 2015 (JP) .................. 2015-212932
Oct. 29, 2015 (JP) .................. 2015-212940

(51) Int. Cl.
B23K 9/073 (2006.01)
B23K 9/067 (2006.01)
(Continued)

(52) U.S. Cl.
CPC .............. B23K 9/073 (2013.01); B23K 9/067 (2013.01); B23K 9/1006 (2013.01); B23K 9/12 (2013.01); B23K 9/124 (2013.01)

(58) Field of Classification Search
CPC ...... B23K 9/073; B23K 9/067; B23K 9/1006; B23K 9/12; B23K 9/124–125;
(Continued)

(56) References Cited

U.S. PATENT DOCUMENTS 8,993,925 B2 3/2015 Fujiwara et al.
2012/0145691 A1 6/2012 Fujiwara et al.
(Continued)

FOREIGN PATENT DOCUMENTS

EP 2 810 732 A2 12/2014
JP 62-6775 A 1/1987
(Continued)

OTHER PUBLICATIONS

English translation to JP 2013233563 (Year: 2020).*
(Continued)

Primary Examiner — Tu B Hoang
Assistant Examiner — Bonita Khlok
(74) Attorney, Agent, or Firm — Hamre, Schumann, Mueller & Larson, P.C.

(57) ABSTRACT

An arc welder includes a welding power supply, a forward/reverse welding wire feeder, and a controller for the power supply and the wire feeder. Welding is implemented by repeating unit welding steps each including a short circuit stage with the welding wire and a base material being short-circuited and an arc stage with an arc being generated between the wire and the material. A transition period continues from a starting point of the arc stage till the wire feeding rate reaches a forward maximum. An average welding current is defined as an average of the welding current during the short circuit and arc stages. Within the transition period, the controller sets a current suppression period during which welding current is smaller than the average welding current. Transition period length T0 and current
(Continued)

suppression period length T1 are set to satisfy the inequality $0 < T1/T0 \leq 0.8$.

9 Claims, 16 Drawing Sheets

(51) Int. Cl.
  *B23K 9/10* (2006.01)
  *B23K 9/12* (2006.01)

(58) Field of Classification Search
  CPC ............ B23K 9/09–093; B23K 9/0732; B23K 9/095–0956; B23K 9/0953; B23K 9/1043; B23K 9/091; B23K 9/092; B23K 9/093
  USPC ........ 219/137.7, 137 PS, 130.51, 125.1, 136
  See application file for complete search history.

(56) References Cited

U.S. PATENT DOCUMENTS

| | | | |
|---|---|---|---|
| 2013/0082041 A1 | 4/2013 | Kawamoto et al. | |
| 2014/0360996 A1* | 12/2014 | Murakami | B23K 9/1062 219/130.21 |
| 2015/0041449 A1 | 2/2015 | Fujiwara et al. | |
| 2015/0076132 A1 | 3/2015 | Murakami et al. | |
| 2016/0346864 A1 | 12/2016 | Matsui et al. | |

FOREIGN PATENT DOCUMENTS

| | | | | |
|---|---|---|---|---|
| JP | 5201266 B2 | | 2/2013 | |
| JP | 5170315 B2 | | 3/2013 | |
| JP | 2013-233563 A | | 11/2013 | |
| JP | 2013233563 | * | 11/2013 | ............ B23K 9/073 |
| JP | 2015-58454 A | | 3/2015 | |
| WO | 2013/190746 A1 | | 12/2013 | |
| WO | 2015/122144 A1 | | 8/2015 | |

OTHER PUBLICATIONS

Office Action received in the corresponding Japanese Patent application, dated Apr. 14, 2020, and corresponding English machine translation (10 pages).

International Search Report issued in PCT/JP2016/079032, dated Dec. 6, 2016 (1 page).

Search report issued in corresponding European Patent Application, dated Jun. 4, 2019 (8 pages).

* cited by examiner

ARC WELDING APPARATUS AND ARC WELDING METHOD

TECHNICAL FIELD

The present invention relates to an arc welding apparatus and an arc welding method.

BACKGROUND ART

In a typical consumable electrode arc welding process, a welding wire is fed at a constant rate to generate an arc between the welding wire and a base material. In such a consumable electrode arc welding process, welding is performed with the welding wire and the base material alternately undergoing a short-circuiting period and an arc period.

A method to improve the welding quality has been proposed in which the welding wire is fed alternately in a forward direction and a reverse direction (see Patent Document 1, for example).

During a certain period of time immediately after the start of the arc period, an arc is generated with the welding wire being fed in the reverse direction. At that time, an inertial force and an arc force caused by the reverse feeding of the welding wire are applied to the droplet formed at an end of the welding wire. This causes the droplet to rise in a direction away from the base material, hindering proper transfer of the droplet to the base material.

TECHNICAL REFERENCE

Patent Document

Patent Document 1: Japanese Patent No. 5201266

SUMMARY OF THE INVENTION

Problems to be Solved by the Invention

The present invention has been proposed under the above-noted circumstances. It is therefore an object of the present invention to provide an arc welding apparatus and an arc welding method which realize proper droplet transfer in the arc period.

Means for Solving the Problems

An arc welding apparatus provided based on a first aspect of the present invention includes: a power supply that supplies welding power to a path including an welding wire and a base material; a wire feeder that feeds the welding wire at a wire feeding rate in a forward direction toward the base material and in a reverse direction away from the base material; and a controller that controls the power supply and the wire feeder such that a plurality of unit welding steps are performed, where each of the unit welding steps includes a short circuit stage in which the welding wire and the base material are short-circuited and an arc stage in which an arc is generated between the welding wire and the base material. The period from the starting point of the arc stage till the wire feeding rate reaches a maximum forward feeding rate in the forward direction is defined as a first transition period. An average value of welding current during the short circuit and the arc stages is defined as an average welding current. The controller is configured to set, within the first transition period, a current suppression first period during which welding current is made smaller than the average welding current. Supposing that the length of the first transition period is T0 and the length of the current suppression first period is T1, the inequality $0 < T1/T0 \leq 0.8$ is satisfied.

Preferably, supposing that the time length from the starting point of the arc stage till the wire feeding rate assumes 0 is T2, the inequality $T1/T2 \geq 0.8$ is satisfied.

Preferably, the starting point of the current suppression first period and the starting point of the first transition period coincide with each other.

Preferably, during the current suppression first period, the welding current is 70% or less of the average welding current.

Preferably, the controller is configured to set, immediately before the first transition period, a maximum reverse feeding period during which the wire feeding rate is maintained at a maximum reverse feeding rate, and also set a current suppression preliminary period during which the welding current is made smaller than the average welding current and which is continuous with the current suppression first period.

Preferably, the controller is configured to set a current suppression second period during which the welding current is made smaller than the average welding current, where the current suppression second period has a starting point after the starting point of the arc stage and an end point coinciding with an end point of the arc stage.

Preferably, the length of the current suppression second period is not less than 1% and not more than 30% of the length of the arc stage.

Preferably, the period from when the wire feeding rate reaches the maximum forward feeding rate during the arc stage till the wire feeding rate reaches a maximum reverse feeding rate during the short circuit stage is defined as a second transition period. In this case, the controller is configured to set, within the second transition period, an earlier part during which the welding wire has a first average acceleration that is negative, a later part during which the welding wire has a second average acceleration that is negative, and a moderate part between the earlier part and the later part during which the welding wire has a third average acceleration. The absolute value of the third average acceleration is set smaller than both of the absolute value of the first average acceleration and the absolute value of the second average acceleration.

Preferably, the controller is configured to set the wire feeding rate during the moderate part to a positive value.

Preferably, the controller is configured to set the wire feeding rate during the moderate part to a constant value.

An arc welding method is provided according to another embodiment of the present invention. The method includes a plurality of unit welding steps each provided with a short circuit stage in which a welding wire and a base material are short-circuited and with an arc stage in which an arc is generated between the welding wire and the base material, where the welding wire is fed during each of the unit welding steps in a forward direction toward the base material and in a reverse direction away from the base material. A first transition period, beginning at the starting point of the arc stage and ending when the wire feeding rate reaches a maximum forward feeding rate in the forward direction, includes a current suppression first period during which welding current is made smaller than an average welding current that is an average value of the welding current during each of the unit welding step. Supposing that the length of the first transition period is T0 and the length of the current suppression first period is T1, the inequality 0<T1/T0≤0.8 is satisfied.

Advantages of the Invention

According to the present invention, a transition period includes a current suppression period. In this current suppression period, the welding current is made smaller than the average welding current. Thus, when an arc is generated in the transition period, it is possible to intentionally weaken the arc force acting on the droplet. Accordingly, the undesired rising of the droplet is prevented, and the droplet can properly transfer to the base material. In addition, the current suppression first period is 0.8 times the transition period at most. This prevents the arc force from being undesirably weakened throughout the arc period.

Other features and advantages of the present invention will become apparent from the detailed description given below with reference to the accompanying drawings.

MODE FOR CARRYING OUT THE INVENTION

The present invention provides an arc welding apparatus and an arc welding method that uses the apparatus. The arc welding apparatus of the present invention generally includes a wire feeder for feeding a welding wire to a base material (welding target), a power supply for supplying a welding power, and a controller for controlling the power supply and the wire feeder. Embodiments of the present invention are described below with reference to the accompanying drawings.

Figure 1:
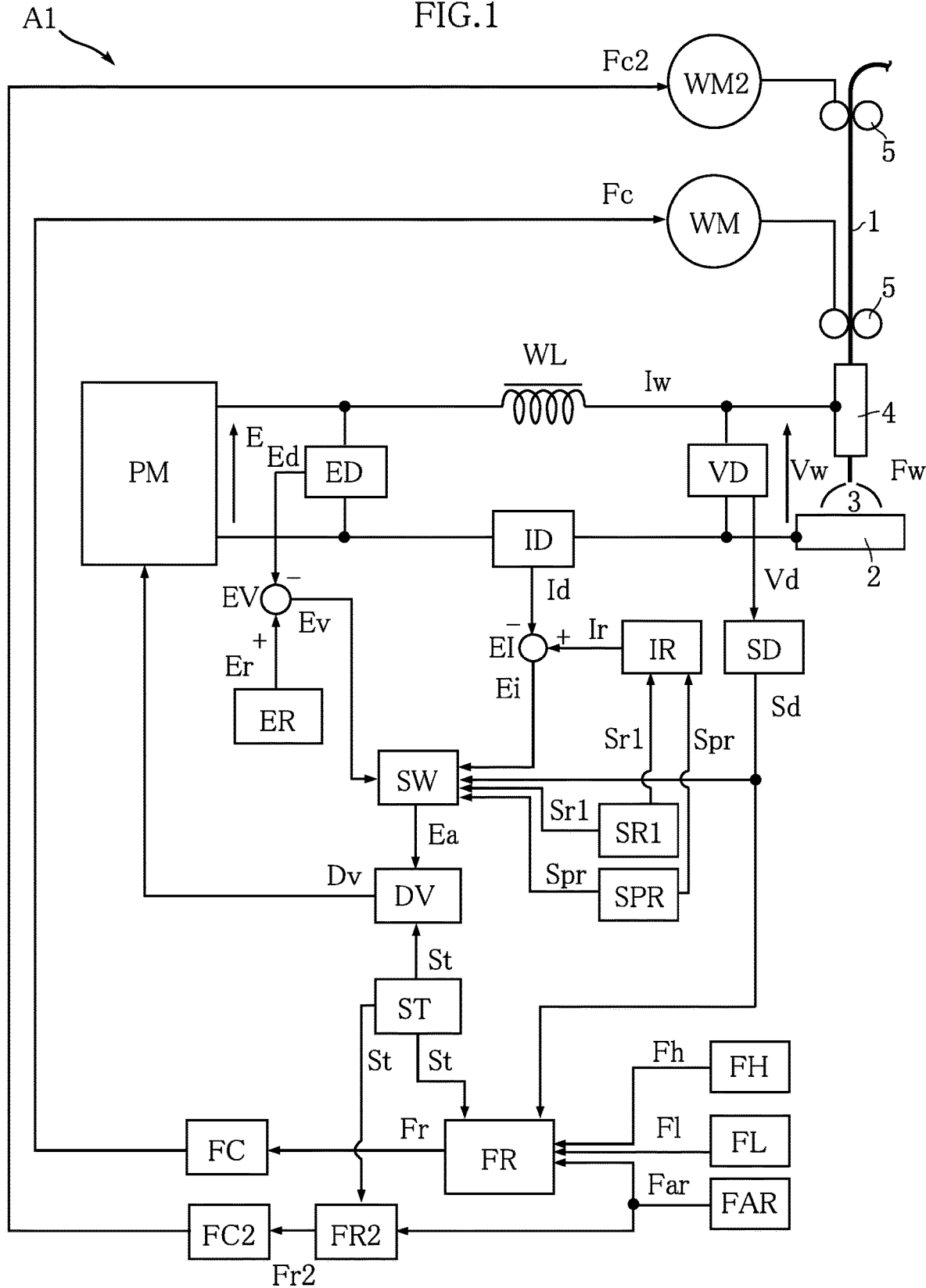
FIG. 1 is a block diagram showing an arc welding apparatus based on a first embodiment according to a first aspect.

FIG. 1 is a block diagram showing an arc welding apparatus based on a first embodiment according to a first aspect of the present invention. The illustrated arc welding apparatus A1 has a wire feeder for feeding a welding wire 1 relative to a base material 2. As shown in the figure, the wire feeder of the present embodiment includes a first motor WM and a second motor WM2. Each of the motors WM and WM2 is connected to at least one roller 5 and drives the roller 5 for rotation. The welding wire 1 is fed through a welding torch 4 by the driven roller 5. During the welding, generation and extinction of an arc 3 are repeated between the welding wire 1 and the base material 2. The welding torch 4 has a power supply tip. A welding voltage Vw is applied between the power supply tip and the base material 2 so that a welding current Iw flows. The arc welding apparatus A1 may be provided with a robot for moving the welding torch 4 along a desired path.

The arc welding apparatus A1 has a power supply for supplying a welding power. As shown in FIG. 1, the power supply of the present embodiment includes a power supply circuit PM. The power supply circuit PM uses a commercial power supply of 3-phase 200 V as an input and outputs an output voltage E. In this process, based on a driving signal Dv (described later), output control by inverter control, for example, is performed. As an example, the power supply circuit PM includes a primary rectifier that rectifies the commercial power supply to a direct current, a smoothing capacitor that smoothes the direct current, an inverter circuit that converts the smoothed direct current to a high-frequency alternating current, a high-frequency transformer that steps down the high-frequency alternating current to a voltage appropriate for welding, and a secondary rectifier that rectifies the stepped-down high-frequency alternating current to a direct current.

The arc welding apparatus A1 has a controller for controlling the wire feeder and the power supply. As shown in FIG. 1, the controller of the present embodiment may include an output voltage setting circuit ER, a voltage error amplifying circuit EV, an output current setting circuit IR, a current error amplifying circuit EI, a short-circuit discrimination circuit SD, a preliminary period setting circuit SPR, a first period setting circuit SR1, a power supply mode switching circuit SW, a power supply driving circuit DV, a welding start circuit ST, a first feeding rate setting circuit FR, a second feeding rate setting circuit FR2, a maximum forward feeding rate setting circuit FH, a maximum reverse feeding rate setting circuit FL, an average feeding rate setting circuit FAR, a first feed control circuit FC and a second feed control circuit FC2. As will be understood from the following description, the controller of the present invention does not necessarily include all of the circuits described above, and one or more of the circuits may be omitted. Also, one or more circuits or elements other than those described above may be added to constitute the controller.

Each of the power supply and the controller may be constituted as a single unit. Alternatively, a plurality of constituent elements that perform the function of the power supply or the controller may be divided in different units.

The arc welding apparatus A1 includes an output voltage detection circuit ED, a welding voltage detection circuit VD, a current detection circuit ID and a reactor WL. The output voltage detection circuit ED detects the output voltage E of the power supply circuit PM and smoothes the detected voltage to output an output voltage detection signal Ed to the voltage error amplifying circuit EV. The welding voltage detection circuit VD detects the welding voltage Vw to output a voltage detection signal Vd to the short-circuit discrimination circuit SD. The current detection circuit ID detects the welding current Iw to output a current detection signal Id to the current error amplifying circuit EI. The reactor WL smoothes the output voltage E. For example, the inductance value of the reactor WL is 200 µH.

Turning to the wire feeder, the first motor WM and the second motor WM2 are driven based on a first feed control signal Fc and a second feed control signal Fc2, respectively. In this process, the first motor WM is controlled to repeat forward feeding and reverse feeding, whereas the second motor WM2 is controlled to perform forward feeding alone. The combination of these two motors realizes periodically repeated forward feeding and reverse feeding of the welding wire 1. It is desirable that the first and the second motors WM and WM2 (the first motor WM in particular) are highly responsive (i.e., the transient response period is short). In the present embodiment, a push-pull type wire feeder that uses two motors is provided. The first motor WM is arranged, as a pull-side motor, closer to the welding torch 4 than the second motor WM2 is (i.e., connected to the roller 5 that is relatively close to the welding torch 4). The second motor WM2 is a push-side motor and arranged further from the welding torch 4 than the first motor WM is. Unlike the present embodiment, the wire feeder may be constituted of a single motor that is rotatable in both of the forward and the reverse directions.

Turning to the above-mentioned controller, the output voltage setting circuit ER outputs an output voltage setting signal Er to the voltage error amplifying circuit EV. The voltage error amplifying circuit EV amplifies the difference between the output voltage setting signal Er and the output voltage detection signal Ed and outputs a voltage error amplified signal Ev to the power supply mode switching circuit SW. The voltage error amplifying circuit EV is used for constant voltage control of the power supply circuit PM.

The short-circuit discrimination circuit SD receives a voltage detection signal Vd and outputs a short-circuiting discrimination signal Sd. When the voltage detection signal Vd is lower than a predetermined discrimination value (e.g. 10V), the short-circuit discrimination circuit SD determines that the process is in the short-circuiting period (short circuit stage) and sets the short-circuiting discrimination signal Sd to a high level. When the voltage detection signal Vd is not lower than the predetermined discrimination value, the short-circuit discrimination circuit SD determines that the process is in the arc period (arc stage) and sets the short-circuiting discrimination signal Sd to a low level.

The output current setting circuit IR receives a preliminary period setting signal Spr and a first period setting signal Sr1 for current suppression (described later) and outputs an output current setting signal Ir. As will be described later, the output current setting signal Ir is used to perform constant current control when the short-circuiting period shifts to the arc period.

The current error amplifying circuit EI receives the output current setting signal Ir and the current detection signal Id and outputs a current error amplified signal Ei. The current error amplified signal Ei is obtained by amplifying the difference between the output current setting signal Ir and the current detection signal Id. The current error amplifying circuit EI is used to control the power supply circuit PM for constant current control.

The welding start circuit ST outputs a welding start signal St. The welding start circuit ST sets the welding start signal St to a high level in activating the welding power supply. As an example, the starting switch of the welding torch 4 corresponds to the welding start circuit ST, but the present invention is not limited to this. For example, the welding start circuit ST may be an element that constitutes the above-described controller or an element that constitutes a robot control device, for example.

The preliminary period setting circuit SPR outputs a preliminary period setting signal Spr. The preliminary period setting signal Spr specifies the value of the welding current Tp1 during a current suppression preliminary period Tp1 (described later) and also specifies the start timing of the period Tp1. The start timing of the current suppression preliminary period Tp1 may be determined based on the detection of a constriction of a droplet.

The first period setting circuit SR1 outputs a first period setting signal Sr1. The first period setting signal Sr1 specifies the value of the welding current Iw during a current suppression first period T1 (described later) and also specifies the length of the period T1.

The power supply mode switching circuit SW receives the current error amplified signal Ei, the voltage error amplified signal Ev, the short-circuiting discrimination signal Sd and the period setting signals Spr, Sr1 to perform predetermined determination and output an error amplified signal Ea. For example, based on the short-circuiting discrimination signal Sd and so on, the power supply mode switching circuit SW identifies a period coming before the time point at which switching between the arc period and the short-circuiting period occurs. To perform constant current control based on each of the period setting signals Spr and Sr1, the power supply mode switching circuit SW outputs the current error amplified signal Ei as the error amplified signal Ea. At other timing, the power supply mode switching circuit SW outputs the voltage error amplified signal Ev as an error amplified signal Ea.

The power supply driving circuit DV receives the error amplified signal Ea and the welding start signal St to output a driving signal Dv. When the welding start signal St is at a high level (welding start), the power supply driving circuit DV outputs the driving signal Dv to perform PWM modulation control based on the error amplified signal Ea. The driving signal Dv drives the inverter circuit within the power supply circuit PM.

The average feeding rate setting circuit FAR outputs an average feeding rate setting signal Far.

The maximum forward feeding rate setting circuit FH outputs a maximum forward feeding rate setting signal Fh that specifies the maximum value of the wire feeding rate Fw in the forward direction. For example, the maximum forward feeding rate setting signal Fh instructs a feeding rate corresponding to the difference between the maximum feeding rate of the feeding rate Fw in the forward direction and the average feeding rate by the average feeding rate setting signal Far.

The maximum reverse feeding rate setting circuit FL outputs a maximum reverse feeding rate setting signal Fl that specifies a maximum value of the wire feeding rate Fw in the reverse direction. For example, the maximum reverse feeding rate setting signal Fl instructs a feeding rate corresponding to the difference between the maximum feeding rate of the feeding rate Fw in the reverse direction and the average feeding rate by the average feeding rate setting signal Far.

The first feeding rate setting circuit FR receives the average feeding rate setting signal Far, the maximum forward feeding rate setting signal Fh, the maximum reverse feeding rate setting signal Fl and the short-circuiting discrimination signal Sd, and outputs a first feeding rate setting signal Fr so that a forward feeding period and a reverse feeding period alternate based on the short-circuiting discrimination signal Sd. In the present embodiment (described later with reference to FIG. 2), the first feeding rate setting signal Fr is a command signal that drives the first motor WM in the forward and the reverse directions and has a generally trapezoidal waveform, but the present invention is not limited to this.

The second feeding rate setting circuit FR2 receives the average feeding rate setting signal Far and outputs a second feeding rate setting signal Fr2. In the present embodiment (described later with reference to FIG. 2), the second feeding rate setting signal Fr2 is a command signal that drives the second motor WM2 at a number of rotations corresponding to the average feeding rate instructed by the average feeding rate setting signal Far, but the present invention is not limited to this.

The first feed control circuit FC receives the first feeding rate setting signal Fr and outputs a first feed control signal Fc to the first motor WM. The first feed control signal Fc causes the first motor WM to rotate to feed the welding wire 1 at the feeding rate instructed by the first feeding rate setting signal Fr.

The second feed control circuit FC2 receives the second feeding rate setting signal Fr2 and outputs a second feed control signal Fc2 to the second motor WM2. The second feed control signal Fc2 causes the second motor WM2 to rotate to feed the welding wire 1 at the feeding rate instructed by the second feeding rate setting signal Fr2.

The feeding rate Fw at which the welding wire 1 is actually fed from the welding torch 4 depends on the driving force applied by each of the first motor WM and the second motor WM2 to the welding wire 1.

Figure 2:
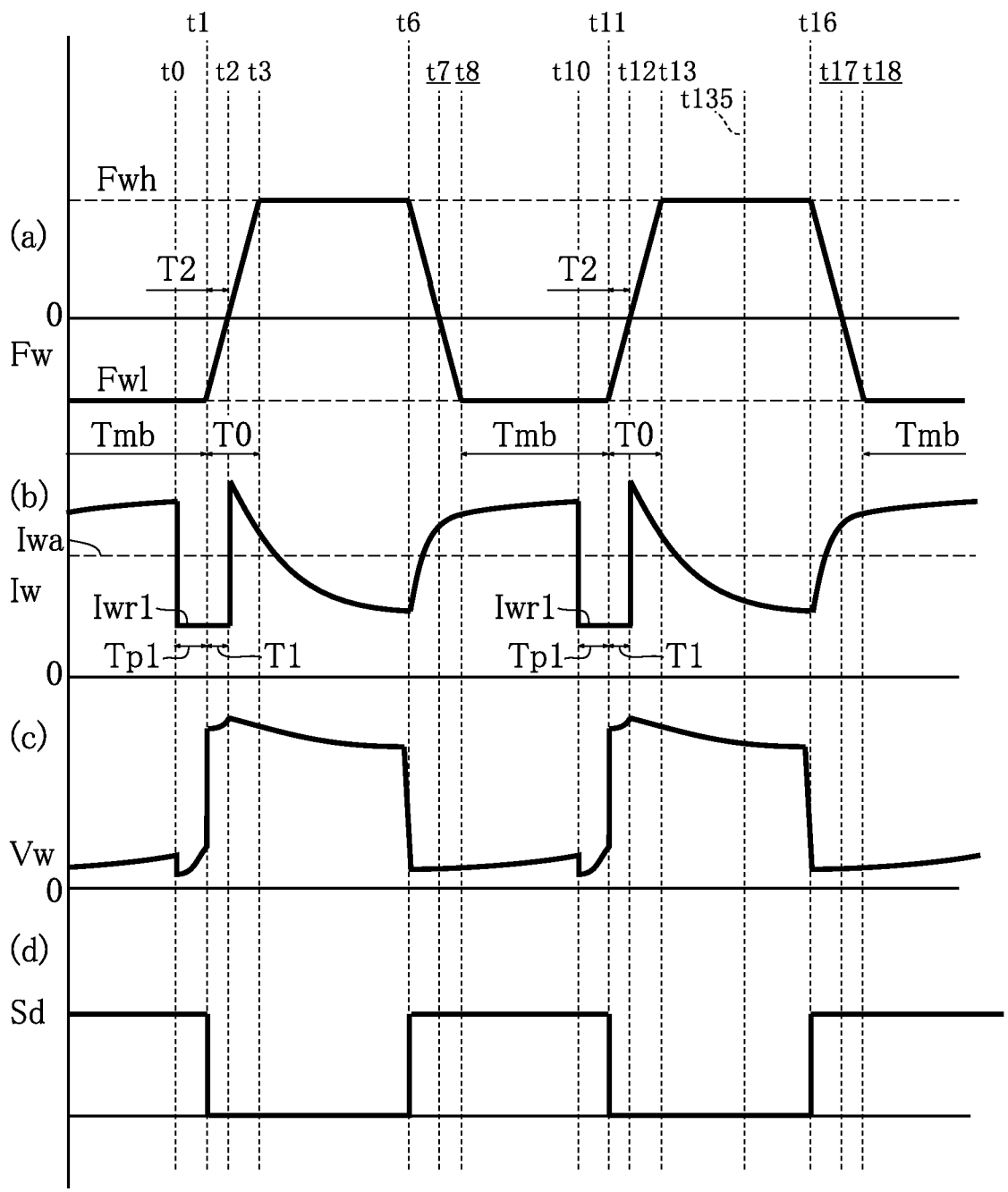
FIG. 2 is a timing chart showing an arc welding method based on the first embodiment according to the first aspect.

FIG. 2 is a timing chart showing an arc welding method based on a first embodiment according to a first aspect of the present invention. In this welding method, use may be made of the arc welding apparatus A1 described above. In the figure, (a) indicates the change over time of the feeding rate Fw of the welding wire, (b) indicates the change over time of the welding current Iw, (c) indicates the change over time of the welding voltage Vw, and (d) indicates the change over time of the short-circuiting discrimination signal Sd.

The wire feeding rate Fw indicated by (a) in FIG. 2 is determined based on the first feeding rate setting signal Fr and the second feeding rate setting signal Fr2. In the present embodiment, the first feeding rate setting signal Fr drives the first motor WM to feed the welding wire 1 at a feeding rate that has a generally trapezoidal waveform, based on the maximum forward feeding rate setting signal Fh and the maximum reverse feeding rate setting signal Fl. On the other hand, the second feeding rate setting signal Fr2 drives the second motor WM2 to feed the welding wire 1 at a constant feeding rate corresponding to the average feeding rate in accordance with the average feeding rate setting signal Far. As a result, the net feeding rate of the wire Fw (the feeding rate of the wire portion that is moving within the welding torch) has a trapezoidal waveform shifted toward the forward side by an amount corresponding to the value of the average feeding rate setting signal Far. In the present embodiment, the amplitude on the forward side by the maximum forward feeding rate setting signal Fh and the amplitude on the reverse side by the maximum reverse feeding rate setting signal Fl are the same.

As indicated by (a) in FIG. 2, the waveform of the feeding rate Fw includes a forward feeding period and a reverse feeding period that alternate with each other with respect to the reference line corresponding to speed 0. The period from time t2 to time t7 is the forward feeding period of the wire, whereas the period from time t7 to time t12 is the reverse feeding period of the wire. As will be described later, the period from time t1 to time t6 is an arc period, whereas the period from time t6 to time t11 is a short-circuiting period. A single arc period and a single short-circuiting period that are continuous with each other constitute a single unit welding step. In the arc welding method according to the present embodiment, a plurality of unit welding steps are repetitively performed.

The timing chart of FIG. 2 corresponds to a steady welding period. An unsteady welding period may exist before or after the steady welding period. For example, an arc start period for smoothly generating an arc may be provided before the steady welding period. A welding ending period for properly ending the welding may be provided after the steady welding period.

The period immediately before time t1 is a maximum reverse feeding period Tmb, during which the feeding rate Fw is the reverse maximum feeding rate Fwl. During this period, the welding wire 1 is short-circuited to the base material 2. At time t0 during the maximum reverse feeding period Tmb, the control mode of the welding power is switched to constant current control. This switching is performed by the power supply mode switching circuit SW. The timing at which the power supply mode switching circuit SW performs the switching to constant current control is specified by the preliminary period setting signal Spr. Simultaneously with the start of the constant current control, the current suppression preliminary period Tp1 starts. The current suppression preliminary period Tp1 continues from time t0 to time t1.

The welding current Iw during the current suppression preliminary period Tp1 is specified based on the preliminary period setting signal Spr. Specifically, first, the preliminary period setting signal Spr is sent to the output current setting circuit IR as shown in FIG. 1. In response to this, the output current setting circuit IR sends an output current setting signal Ir to the current error amplifying circuit EI. The current error amplifying circuit EI sends the current error amplified signal Ei (corresponding to the amplified difference between the signals Ir and Id) to the power supply mode switching circuit SW. The power supply mode switching circuit SW sends the current error amplified signal Ei to the power supply driving circuit DV. (That is, at this timing, the error amplified signal Ea shown in FIG. 1 is the current error amplified signal Ei.) Based on the current error amplified signal Ei, the power supply driving circuit DV controls the power supply circuit PM, so that the desired welding current Iw (the first suppressed welding current Iwr1) flows. The welding current Iw during the current suppression preliminary period Tp1 is set to be smaller than the average welding current Iwa (the time average of the welding current Iw during the unit welding step) and preferably 70% or less of the average welding current Iwa.

At time t1, the short-circuiting condition ends and an arc 3 (see FIG. 1) is generated. In response to this, as shown in (c) in FIG. 2, the welding voltage Vw sharply increases to the arc voltage of several tens of volts, and the short-circuiting discrimination signal Sd turns to a low level as shown in (d). When the short-circuiting discrimination signal Sd turns to the low level, the first feeding rate setting circuit FR outputs a first feeding rate setting signal Fr to increase the feeding rate Fw toward the forward maximum feeding rate Fwh set by the maximum forward feeding rate setting signal Fh. In the present embodiment, the second feeding rate setting circuit FR2 controls the second motor WM2 to generate a constant driving force for feeding the welding wire 1 at the average feeding rate Fwa in accordance with the instruction by the average feeding rate setting signal Far.

The current suppression first period T1 starts from time t1. The current suppression first period T1 is continuous with the current suppression preliminary period Tp1, and its starting point coincides with the starting point of the arc period. The welding current Iw during the current suppression first period T1 is specified substantially in the same manner as that during the current suppression preliminary period Tp1. Specifically, as shown in FIG. 1, the first period setting circuit SR1 sends the first period setting signal Sr1 to the output current setting circuit IR. In response to this, the output current setting circuit IR sends an output current setting signal Ir to the current error amplifying circuit EI. The current error amplifying circuit EI sends the current error amplified signal Ei to the power supply mode switching circuit SW. The power supply mode switching circuit SW sends the current error amplified signal Ei to the power supply driving circuit DV (as an error amplified signal Ea). The power supply driving circuit DV controls the power supply circuit PM, so that the desired welding current Iw (Iwr1) flows. In the present embodiment, the welding current Iw during the current suppression first period T1 has the same value as the welding current Iw during the current suppression preliminary period Tp1.

At time t2, the feeding rate Fw becomes 0 and the forward feeding period starts. At time t2, based on the first period setting signal Sr1, the power supply mode switching circuit SW ends the current suppression first period T1. As a result, the control mode shifts from constant current control to constant voltage control. When the length of the period from time t1 (the starting point of the arc period) to time t2 (at which the feeding rate Fw becomes 0) is defined as a time length T2, the ratio of the current suppression first period T1 to the time length T2 (T1/T2) is 1.0. It is preferable that T1/T2 is 0.8 or more.

At time t3, the feeding rate Fw reaches the forward maximum feeding rate Fwh. The first feeding rate setting circuit FR maintains the forward maximum feeding rate Fwh. The period during which the feeding rate changes from the reverse maximum feeding rate Fwl to the forward maximum feeding rate Fwh is defined as a transition period T0. The ratio (T1/T0) of the current suppression first period T1 to the transition period T0 is set to be 0<T1/T0≤0.8. That is, in the present embodiment, the current suppression first period T1 is shorter than the transition period T0.

As a result of feeding the welding wire 1 in the forward direction, the welding wire 1 is short-circuited to the base material 2 at time t6. Thus, the shift from the arc period to the short-circuiting period occurs. In response to this, the welding voltage Vw drops sharply to the short-circuiting voltage of several volts as shown in (c) in FIG. 2, and the short-circuiting discrimination signal Sd turns to a high level as shown in (d). Thereafter, the welding current Iw gradually increases as shown in (b). When the short-circuiting discrimination signal Sd becomes a high level at time t6, the power supply driving circuit DV changes the welding current Iw through time t7 (at which the feeding rate Fw assumes 0) to time t8 (at which the feeding rate Fw reaches the reverse maximum feeding rate Fwl).

The first feeding rate setting circuit FR outputs the first feeding rate setting signal Fr such that the reverse maximum feeding rate Fwl specified by the maximum reverse feeding rate setting signal Fl is reached at time t8.

After time t8, while the short-circuiting period continues, the maximum reverse feeding period Tmb is maintained. At time t10, in accordance with the preliminary period setting signal Spr, the power supply mode switching circuit SW switches the control mode from constant voltage control to constant current control, and the next current suppression preliminary period Tp1 is started. After the current suppression preliminary period Tp1 is started, the same control as that from time t0 to time t8 is performed from time t10 to time t18. By periodically repeating such control, arc welding in which the short-circuiting period and the arc period alternate is performed.

Examples of the numerical values for the arc welding method of the present embodiment are given below. The length of a single unit welding step may be 8 ms to 20 ms and about 10 ms, for example. The length of a single short-circuiting period may be 2 ms to 10 ms and about 4 ms, for example. The length of a single arc period may be 3 ms to 15 ms and about 6 ms, for example. The forward maximum feeding rate Fwh may be 30 m/min to 100 m/min and about 80 m/min, for example. The reverse maximum feeding rate Fwl may be −30 m/min to −100 m/min and about −70 m/min, for example. The average feeding rate may be 1 m/min to 15 m/min and about 10 m/min, for example. The average welding current Iwa may be 30 A to 350 A and about 250 A, for example. The transition period T0 may be 1 ms to 10 ms and about 3 ms, for example. The time length T2 may be 0.5 ms to 5 ms and about 3 ms, for example. The current suppression preliminary period Tp1 may be 0.1 ms to 1.5 ms and about 1 ms, for example. The current suppression first period T1 may be 0.1 ms to 2 ms and about 1 ms, for example. The suppressed welding current Iwr1 may be 20 A to 150 A and about 50 A, for example.

The advantages of the arc welding apparatus A1 and the arc welding method based on the present embodiment are described below.

According to the present embodiment, the current suppression first period T1 is set in the transition period T0. During the current suppression first period T1, the welding current Iw is set to the suppressed welding current Iwr1 smaller than the average welding current Iwa. Thus, in the state in which an arc is generated in the transition period T0, the arc force acting on the droplet is intentionally weakened. This prevents the droplet from rising and facilitates proper transfer of the droplet to the base material 2. The current suppression first period T1 is 0.8 times the transition period T0 at most. This prevents the arc force from being undesirably weakened throughout the arc period.

Further, in the present embodiment, the ratio (T1/T2) of the current suppression first period T1 to the time length T2 is 0.8 or more. Thus, the welding current Iw is kept suppressed to the suppressed welding current Iwr1 until immediately before the time (t2) when feeding of the welding wire 1 shifts from the reverse feeding state (t1) to the stopped state. This is favorable for proper droplet transfer.

Moreover, in the present embodiment, the starting point of the current suppression first period T1 coincides with the starting point of the transition period T0. This means that the welding current Iw is set to the suppressed welding current Iwr1 when the transition period T0 is started. Thus, proper droplet transfer is realized simultaneously with the start of the arc period.

Since the suppressed welding current Iwr1 is 70% or less of the average welding current Iwa, rising of the droplet is reliably prevented.

Moreover, in the present embodiment, the current suppression preliminary period Tp1 is provided prior to and continuous with the current suppression first period T1. Thus, immediately before the shift of the short-circuiting period to the arc period occurs, the welding current Iw is set to a value smaller than the average welding current Iwa. This allows more reliable droplet transfer.

Figure 3:
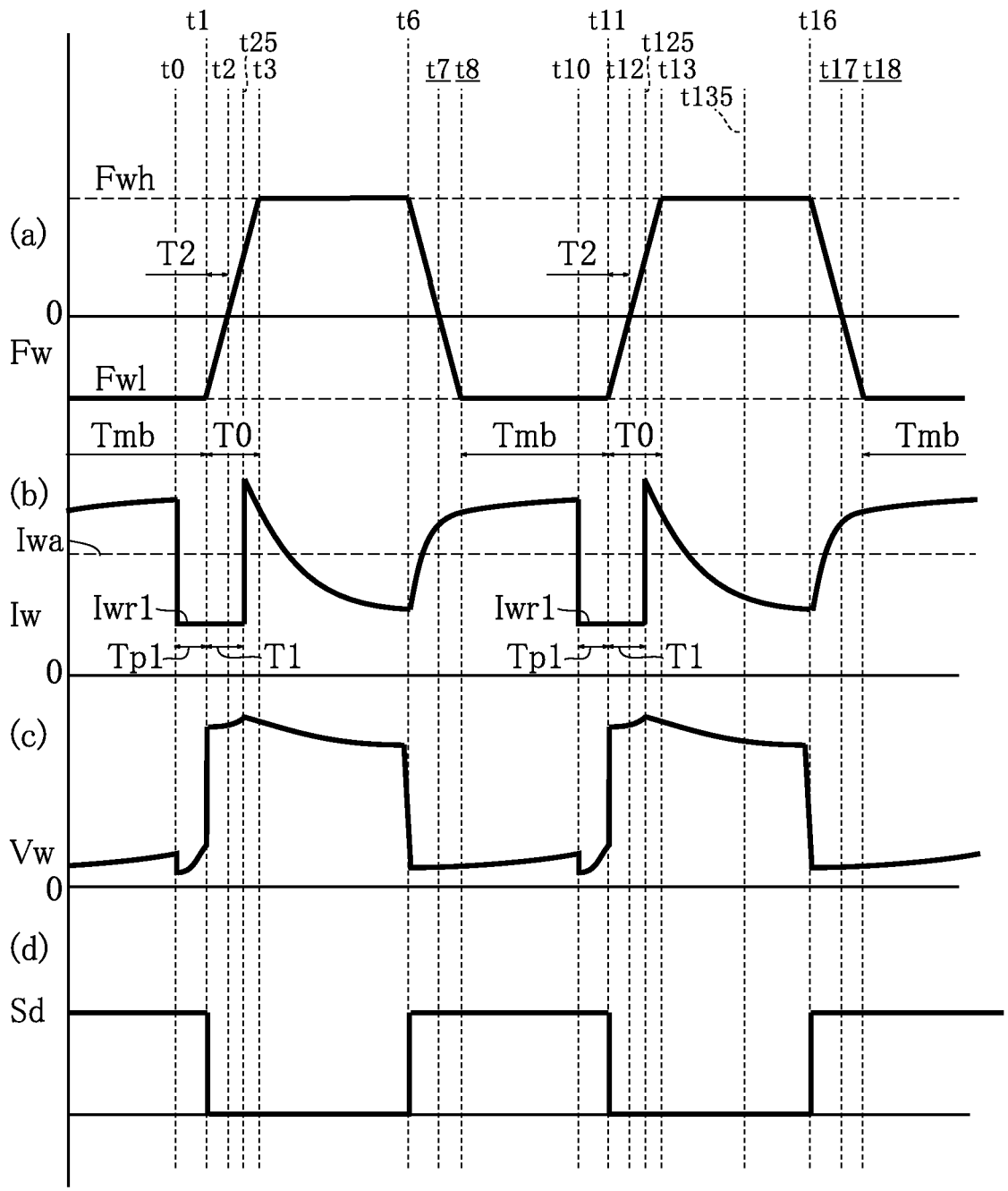
FIG. 3 is a timing chart showing a variation of the arc welding method based on the first embodiment according to the first aspect.
Figure 4:
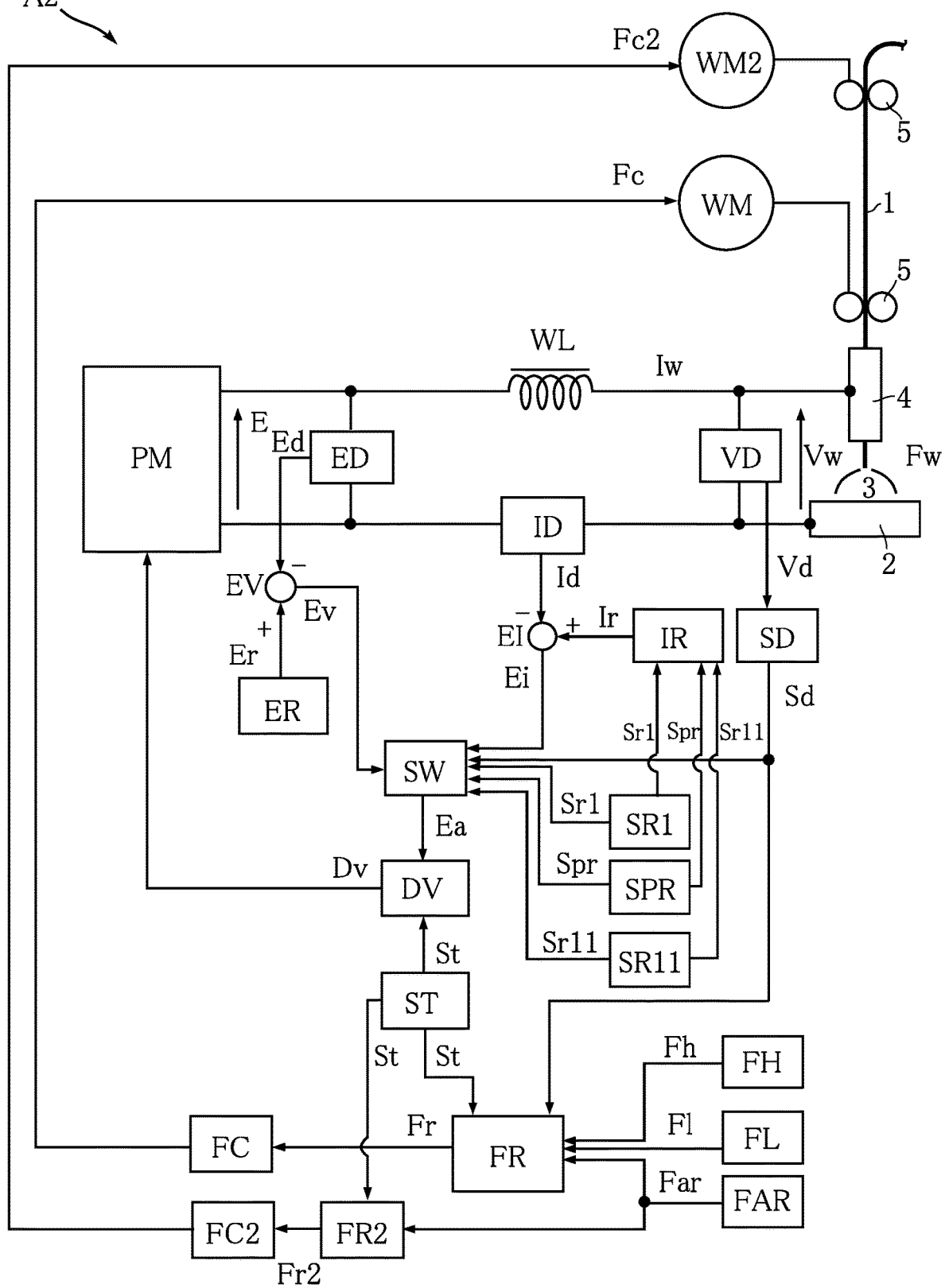
FIG. 4 is a block diagram showing an arc welding apparatus based on a second embodiment according to the first aspect.
Figure 5:
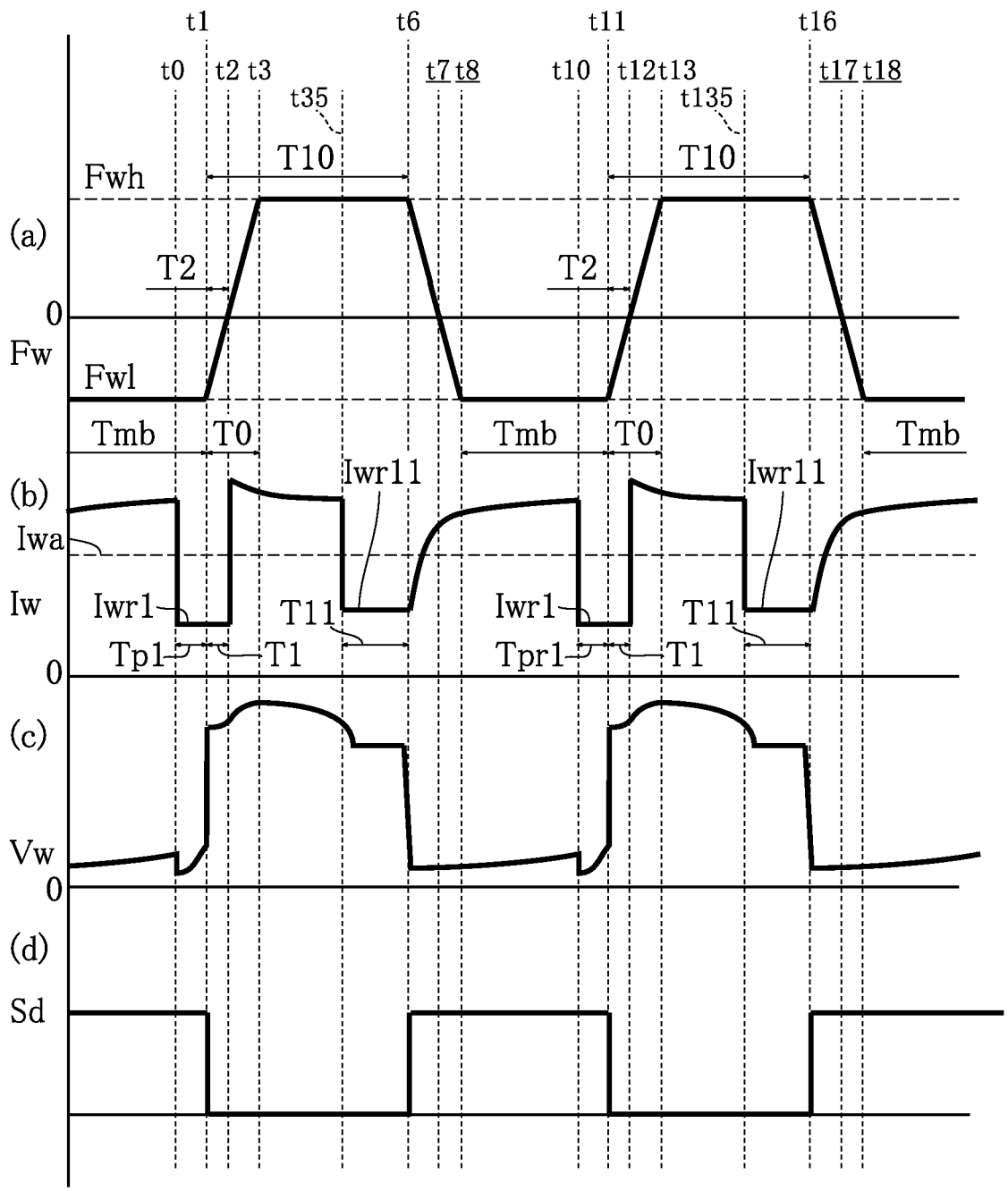
FIG. 5 is a timing chart showing an arc welding method based on the second embodiment according to the first aspect.

FIGS. 3-5 illustrate a variation of the above-described first embodiment and another embodiment. In these figures, the elements that are identical or similar to those of the first embodiment are designated by the same reference signs.

FIG. 3 is a timing chart showing a variation of the arc welding method based on the first embodiment. In this variation, the current suppression first period T1 starting at time t1 continues to time t25 between time t2 and time t3. That is, in this variation, the ratio of the current suppression first period T1 to the time length T2 (T1/T2) is greater than 1.0. The ratio of the current suppression first period T1 to the transition period T0 (T1/T0) is about 0.3.

This variation also prevents a droplet from rising and facilitates proper transfer of the droplet to the base material 2. In this variation, from time t2 to time t25, the welding current Iw is set to the suppressed welding current Iwr1 (smaller than the average welding current Iwa), while the feeding rate Fw is the forward feeding rate. This does not cause problems such as deterioration of the welding quality, because the current suppression first period T1 ends at time t25, which is before time t3 (at which the feeding rate Fw reaches the forward maximum feeding rate Fwh).

FIG. 4 shows an arc welding apparatus based on a second embodiment according to the first aspect of the present invention. The arc welding apparatus A2 of the present embodiment is different from the foregoing arc welding apparatus A1 in that it includes a second period setting circuit SR11 as a constituent element of the controller that controls the power supply and the wire feeder.

The second period setting circuit SR11 outputs a second period setting signal Sr11. The second period setting signal Sr11 specifies the value of the welding current Iw during a current suppression second period T11 (described later) and the start timing of the current suppression second period T11. This timing may be set based on the time elapsed since arc generation.

Similarly to other period setting signals Spr and Sr1 described above, the second period setting signal Sr11 is inputted to the power supply mode switching circuit SW and the output current setting circuit IR. Since the manner in which the related circuits (the power supply mode switching circuit SW, the output current setting circuit IR, the current error amplifying circuit EI and so on) operate based on the second period setting signal Sr11 is substantially the same as the case for other period setting signals Spr and Sr1 described above, the description is omitted.

FIG. 5 is a timing chart showing an arc welding method based on the present second embodiment. In this welding method, use is made of the arc welding apparatus A2.

From time t0 to time t3, the same process as that of the arc welding method according to the foregoing first embodiment is performed. In the present second embodiment, at time t35, the power supply mode switching circuit SW switches the control mode from constant voltage control to constant current control. This switching is performed based on the second period setting signal Sr11. Also, in accordance with the second period setting signal Sr11, the current suppression second period T11 is started by the power supply driving circuit DV. The current suppression second period T11 is set such that its starting point is after the starting point of the arc period and its end point coincides with the end point of the arc period. In the second embodiment, the starting point of the current suppression second period T11 is after the end point of the transition period T0 and within the period during which the feeding rate is the forward maximum feeding rate Fwh. During the current suppression second period T11, the welding current Iw is set to a second suppressed welding current Iwr11 smaller than the average welding current Iwa. Preferably, the second suppressed welding current Iwr11 is 70% or less of the average welding current Iwa.

When the arc period ends at time t6, in accordance with the second period setting signal Sr11, the power supply mode switching circuit SW switches the control mode from constant current control to constant voltage control. Thus, the current suppression second period T11 ends. It is preferable that the length of the current suppression second period T11 is not less than 1% and not more than 30% of the time length T10 of the arc period. The control after time t6 is performed in the same manner as the arc welding method of the first embodiment. From time t135 to time t16 shown in the figure, the same control as that from time t35 to time t6 is performed.

Examples of the numerical values for the arc welding method of the second embodiment are given below. The length of a single unit welding step may be 8 ms to 20 ms and about 10 ms, for example. The frequency at which the unit welding step is repeated is preferably not less than 50 Hz. The length T10 of a single arc period may be 3 ms to 15 ms and about 6 ms, for example. The current suppression second period T11 may be 0.5 ms to 10 ms and about 1 ms, for example. The second suppressed welding current Iwr11 may be 20 A to 200 A and about 50 A, for example. The average welding current Iwa may be 30 A to 350 A and about 250 A, for example. It is preferable that the average welding current Iwa is not less than 200 A when the diameter of the welding wire 1 is 1.2 mm. The average welding current Iwa may be in a range that causes globular transfer to occur as a form of the droplet transfer. Other values may be the same as those of the arc welding method of the first embodiment.

The second embodiment also allows a droplet to be properly transferred to the base material 2. Further, the second embodiment includes the current suppression second period T11 of which starting point is after the starting point (t1) of the arc period and of which end point coincides with the end point (t6) of the arc period. During the current suppression second period T11, the welding current Iw is set to be smaller than the average welding current Iwa. Thus, generation of spatter due to excessive welding current is prevented at the end point of the arc period, i.e., the starting point of the short-circuiting period.

Since the length of the current suppression second period T11 is not less than 1% and not more than 30% of the length T10 of the arc period, lack of the input power during the arc period is avoided while generation of spatter is prevented.

In the second embodiment, the average frequency at which a plurality of unit welding steps each including the arc period and the short-circuiting period are repeated is not less than 50 Hz. Arc welding at such a relatively high frequency is realized by properly preventing generation of spatter.

In the second embodiment, the average welding current Iwa may be in the range that causes globular transfer to occur as a form of the droplet transfer. Such relatively high current arc welding can be realized by properly preventing generation of spatter.

In each of the foregoing embodiments, the waveform representing the wire feeding rate Fw is generally trapezoidal. However, the present invention is not limited to this, and the wire feeding rate may have any other waveforms in which the forward maximum feeding rate Fwh and the reverse maximum feeding rate Fwl alternate. Moreover, also the push-pull method that uses two motors WM and WM2 as the wire feeder is favorable for increasing the response speed, the present invention is not limited to this. As noted above, the wire feeder may be constituted of a single motor. This holds for the embodiments described below.

Figure 6:
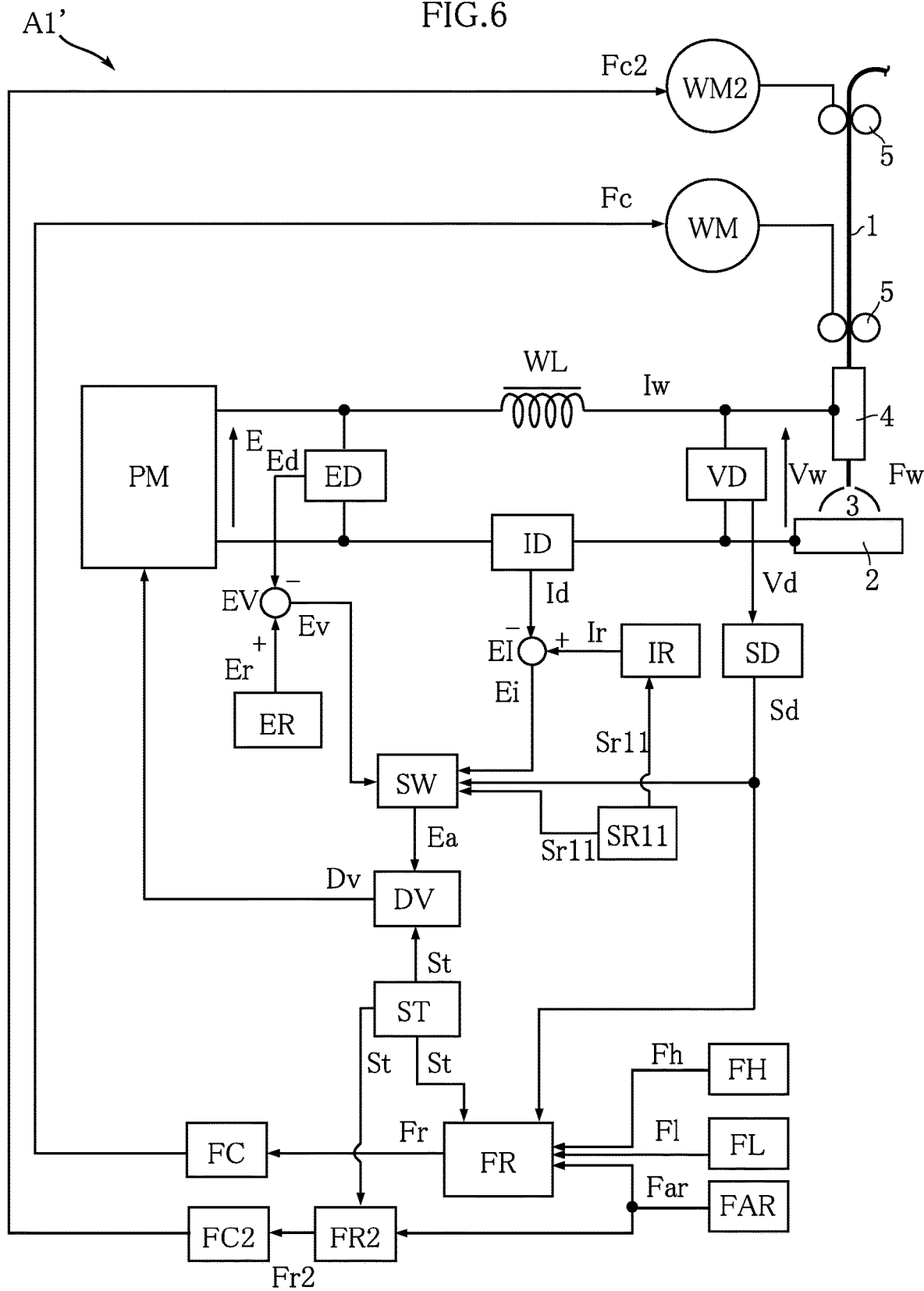
FIG. 6 is a block diagram showing an arc welding apparatus based on a first embodiment according to a second aspect.

FIG. 6 is a block diagram showing an arc welding apparatus based on a first embodiment according to a second aspect of the present invention. The arc welding apparatus A1' shown in the figure is different from the above-described arc welding apparatus A2 (see FIG. 4) based on the second embodiment according to the first aspect in that it does not include the preliminary period setting circuit SPR and the first period setting circuit SR1 but includes the second period setting circuit SR11 alone. Other constituent elements and their functions are basically the same as those of the arc welding apparatus A2. Therefore, the different points are mainly described below. Note that although this embodiment includes only a single period setting circuit, this circuit is still referred to hereinafter as the "second" period setting circuit SR11. The same holds for the signal Sr11, the period T11 and so on described below.

As shown in FIG. 6, the second period setting circuit SR11 outputs a second period setting signal Sr11 to the output current setting circuit IR and the power supply mode switching circuit SW. The second period setting signal Sr11 specifies the value of the welding current Iw during the current suppression second period T11 and the start timing of the current suppression second period T11. This timing may be set based on the time elapsed since arc generation.

The output current setting circuit IR receives the second period setting signal Sr11 and outputs an output current setting signal Ir. The current error amplifying circuit EI receives the output current setting signal Ir and the current detection signal Id and outputs a current error amplified signal Ei.

The power supply mode switching circuit SW receives the current error amplified signal Ei, the voltage error amplified signal Ev, the short-circuiting discrimination signal Sd and the second period setting signal Sr11, and outputs an error amplified signal Ea. The power supply mode switching circuit SW identifies, based on the short-circuiting discrimination signal Sd and so on, the period before the time point at which switching between the arc period and the short-circuiting period occurs, and outputs the current error amplified signal Ei as an error amplified signal Ea to perform constant current control based on the instruction by the second period setting signal Sr11. At other timing, the voltage error amplified signal Ev is outputted as an error amplified signal Ea.

Figure 7:
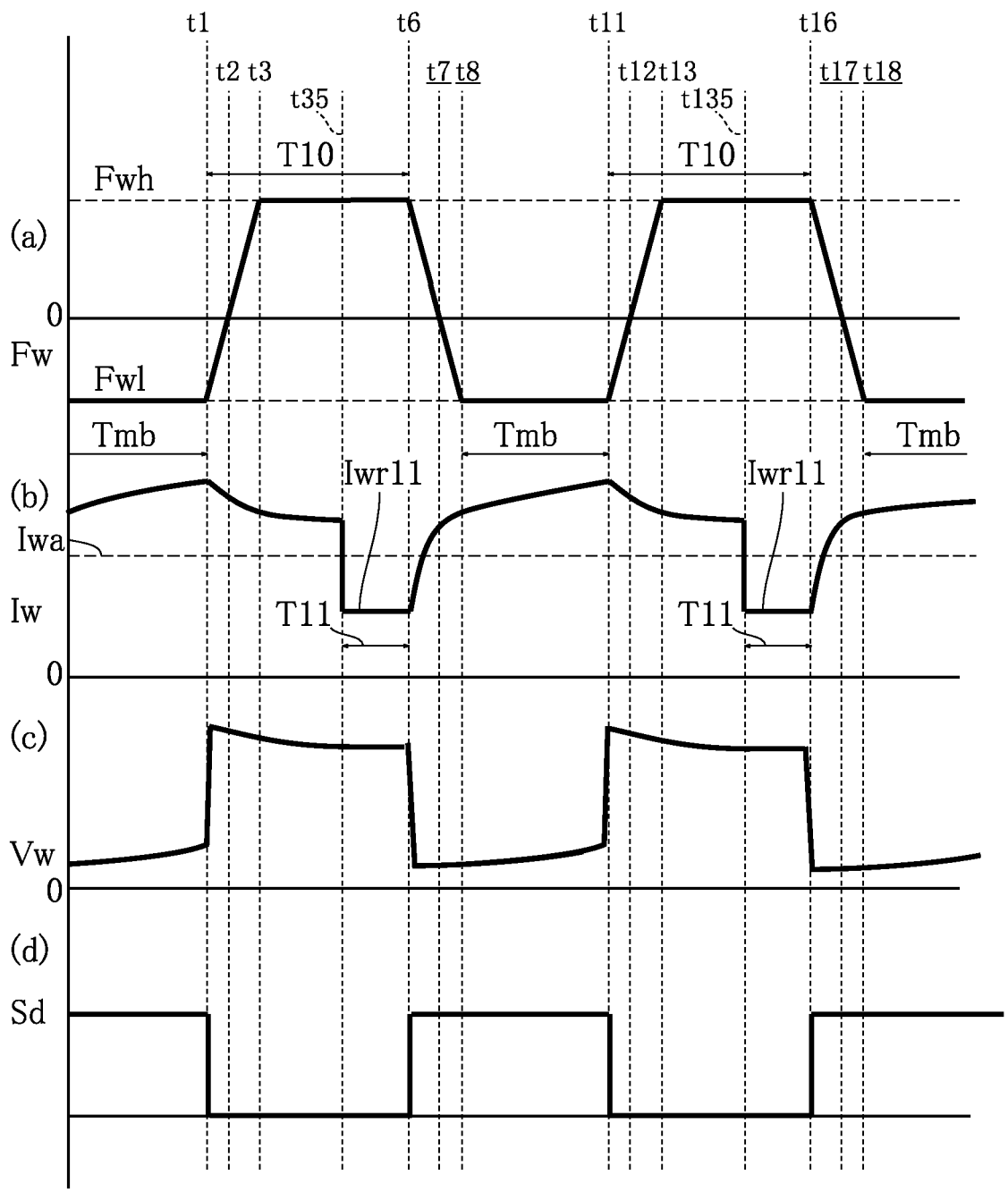
FIG. 7 is a timing chart showing an arc welding method based on the first embodiment according to the second aspect.

FIG. 7 is a timing chart showing an arc welding method based on the first embodiment according to the second aspect of the present invention. In this welding method, use is made of the arc welding apparatus A1' described above. In the figure, (a) indicates the change over time of the feeding rate Fw of the wire, (b) indicates the change over time of the welding current Iw, (c) indicates the change over time of the welding voltage Vw, and (d) indicates the change over time of the short-circuiting discrimination signal Sd.

The wire feeding rate Fw indicated by (a) in FIG. 7 is determined based on the first feeding rate setting signal Fr and the second feeding rate setting signal Fr2. The first feeding rate setting signal Fr drives the first motor WM to feed the welding wire 1 at a feeding rate that has a generally trapezoidal waveform in accordance with the maximum forward feeding rate setting signal Fh and the maximum reverse feeding rate setting signal Fl. On the other hand, the second feeding rate setting signal Fr2 drives the second motor WM2 to feed the welding wire 1 at a constant feeding rate corresponding to the average rate in accordance with the average feeding rate setting signal Far. As a result, the feeding rate has a trapezoidal waveform shifted toward the forward side by an amount corresponding to the value of the average feeding rate setting signal Far. The amplitude on the forward side by the maximum forward feeding rate setting signal Fh and the amplitude on the reverse side by the maximum reverse feeding rate setting signal Fl are the same.

In (a) of FIG. 7, the waveform of the feeding rate Fw includes a forward feeding period and a reverse feeding period that alternate with each other with respect to the reference line corresponding to speed 0. The period from time t2 to time t7 is the forward feeding period, whereas the period from time t7 to time t12 is the reverse feeding period. The period from time t1 to time t6 is the arc period, whereas the period from time t6 to time t11 is the short-circuiting period. A single arc period and a single short-circuiting period that are continuous with each other constitute a single unit welding step. In the arc welding method according to the present embodiment, a plurality of unit welding steps are repetitively performed.

The timing chart of FIG. 7 corresponds to a steady welding period. An unsteady welding period may be provided before or after the steady welding period. For example, an arc start period for smoothly generating an arc may be provided before the steady welding period. A welding ending period for properly ending the welding may be provided after the steady welding period.

The period immediately before time t1 is a maximum reverse feeding period Tmb, during which the feeding rate Fw is the reverse maximum feeding rate Fwl. During this period, the welding wire 1 is short-circuited to the base material 2. The control mode has been switched to constant current control by the power supply mode switching circuit SW.

At time t1, the short-circuiting condition ends and an arc 3 is generated. In response to this, as shown in (c) in FIG. 7, the welding voltage Vw sharply increases to the arc voltage of several tens of volts, and the short-circuiting discrimination signal Sd turns to the low level (arc) as shown in (d). When the short-circuiting discrimination signal Sd is set to the low level, the first feeding rate setting circuit FR outputs a first feeding rate setting signal Fr to increase the feeding rate Fw toward the forward maximum feeding rate Fwh set by the maximum forward feeding rate setting signal Fh. The second feeding rate setting circuit FR2 controls the second motor WM2 to generate a constant driving force for feeding the welding wire 1 at the average feeding rate Fwa in accordance with the instruction by the average feeding rate setting signal Far.

At time t2, the feeding rate Fw becomes 0 and the forward feeding period starts. At time t3, the feeding rate Fw reaches the forward maximum feeding rate Fwh. The first feeding rate setting circuit FR maintains the forward maximum feeding rate Fwh for a predetermined time period.

At time t35, the power supply mode switching circuit SW switches the control mode from constant voltage control to constant current control. This switching is performed based on the second period setting signal Sr11. Further, in accordance with the second period setting signal Sr11, the current suppression second period T11 is started by the power supply driving circuit DV. The current suppression second period T11 is set such that its starting point is after the starting point of the arc period and its end point coincides with the endpoint of the arc period. In the present embodiment, the starting point of the current suppression second period T11 is within the period during which the feeding rate Fw is the forward maximum feeding rate Fwh. During the current suppression second period T11, the welding current Iw is set to a second suppressed welding current Iwr11 smaller than the average welding current Iwa. Preferably, the second suppressed welding current Iwr11 is 70% or less of the average welding current Iwa.

As a result of feeding the welding wire 1 in the forward direction, the welding wire 1 is short-circuited to the base material 2 at time t6. Thus, the shift from the arc period to the short-circuiting period occurs. In response to this, the welding voltage Vw drops sharply to the short-circuiting voltage of several volts as shown in (c), and the short-circuiting discrimination signal Sd turns to a high level as shown in (d).

When the arc period ends at time t6, the power supply mode switching circuit SW switches the control mode from constant current control to constant voltage control in accordance with the second period setting signal Sr11. Thus, the current suppression second period T11 ends. It is preferable that the length of the current suppression second period T11 is not less than 1% and not more than 30% of the time length T10 (from time t1 to time t6), which is the time length of the arc period. Thereafter, the welding current Iw gradually increases as shown in (b). When the short-circuiting discrimination signal Sd is set to a high level at time t6, the power supply driving circuit DV changes the welding current Iw through time t7 at which the feeding rate Fw assumes 0 to time t8 at which the feeding rate Fw reaches the reverse maximum feeding rate Fwl.

The first feeding rate setting circuit FR outputs the first feeding rate setting signal Fr such that the reverse maximum feeding rate Fwl by the maximum reverse feeding rate setting signal Fl is reached at time t8.

After time t8, while the short-circuiting period started at time t6 is continued, the feeding rate Fw is maintained at the reverse maximum feeding rate Fwl so that the maximum reverse feeding period Tmb is maintained. Thereafter, from time t11 to time t18 including the time t135, the same control as that from time t1 to time t8 is performed. By periodically repeating such control, arc welding in which the short-circuiting period and the arc period alternate is performed.

Examples of the numerical values for the arc welding method of the present embodiment are given below. The length of a single unit welding step may be 8 ms to 20 ms and about 10 ms, for example. The length of a single short-circuiting period may be 2 ms to 10 ms and about 4 ms, for example. The length T10 of a single arc period may be 3 ms to 15 ms and about 6 ms, for example. The forward maximum feeding rate Fwh may be 30 m/min to 100 m/min and about 80 m/min, for example. The reverse maximum feeding rate Fwl may be −30 m/min to −100 m/min and about −70 m/min, for example. The average feeding rate may be 1 m/min to 15 m/min and about 10 m/min, for example. The current suppression second period T11 may be 0.5 ms to 10 ms and about 1 ms, for example. The second suppressed welding current Iwr11 may be 20 A to 200 A and about 50 A, for example. The average welding current Iwa may be 30 A to 350 A and about 250 A, for example. It is preferable that the average welding current Iwa is not less than 200 A when the diameter of the welding wire 1 is 1.2 mm. The average welding current Iwa may be in a range in which globular transfer occurs as a form of droplet transfer.

The advantages of the arc welding apparatus A1' and the arc welding method according to the present embodiment are described below.

The present embodiment includes the current suppression second period T11 of which starting point is after the starting point (t1) of the arc period and of which end point coincides with the end point (t6) of the arc period. During the current suppression second period T11, the welding current Iw is suppressed to be smaller than the average welding current Iwa. Thus, generation of spatter due to excessive welding current Iw is prevented at the end point of the arc period, i.e., the starting point of the short-circuiting period.

Since the length of the current suppression second period T11 is not less than 1% and not more than 30% of the length T10 of the arc period, lack of the input power during the arc period is avoided while generation of spatter is prevented.

Also, in the present embodiment, the average frequency at which a plurality of unit welding steps each including the arc period and the short-circuiting period are repeated is not less than 50 Hz. Arc welding at such a relatively high frequency is realized by properly preventing generation of spatter.

Further, in the present embodiment, the average welding current Iwa may be in a range that causes globular transfer to occur as a form of the droplet transfer. In such a case, such relatively high current arc welding can be realized by properly preventing generation of spatter.

FIGS. 8-11 show other embodiments according to the second aspect.

Figure 8:
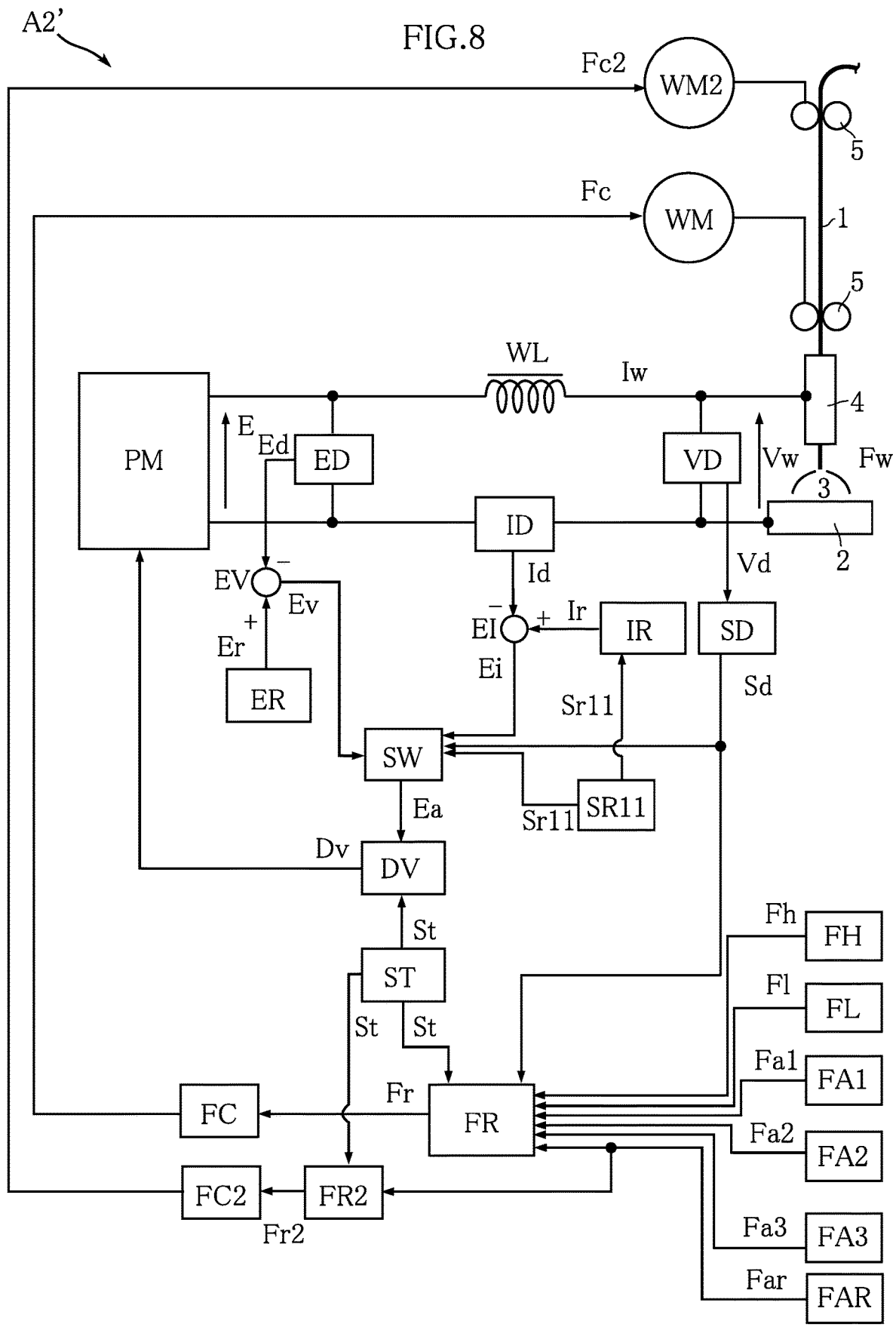
FIG. 8 is a block diagram showing an arc welding apparatus based on a second embodiment according to the second aspect.

FIG. 8 shows an arc welding apparatus based on a second embodiment according to the second aspect of the present invention. The arc welding apparatus A2' of the present embodiment includes, in addition to the constituent elements of the foregoing arc welding apparatus A1', an earlier transition acceleration setting circuit FA1, a moderate transition acceleration setting circuit FA2, and a later transition acceleration setting circuit FA3.

The earlier transition acceleration setting circuit FA1 outputs an earlier transition acceleration setting signal Fa1 that specifies the acceleration of the feeding rate Fw during an earlier transition part set within a reverse transition period. The moderate transition acceleration setting circuit FA2 outputs a moderate transition acceleration setting signal Fa2 that specifies the acceleration of the feeding rate Fw during a moderate transition part set within the reverse transition period. The later transition acceleration setting circuit FA3 outputs a later transition acceleration setting signal Fa3 that specifies the acceleration of the feeding rate Fw during a later transition part set within the reverse transition period.

In the present embodiment, the first feeding rate setting circuit FR receives the short-circuiting discrimination signal Sd, the maximum forward feeding rate setting signal Fh, the maximum reverse feeding rate setting signal Fl, the earlier transition acceleration setting signal Fa1, the moderate transition acceleration setting signal Fa2, the later transition acceleration setting signal Fa3 and the average feeding rate setting signal Far.

Figure 9:
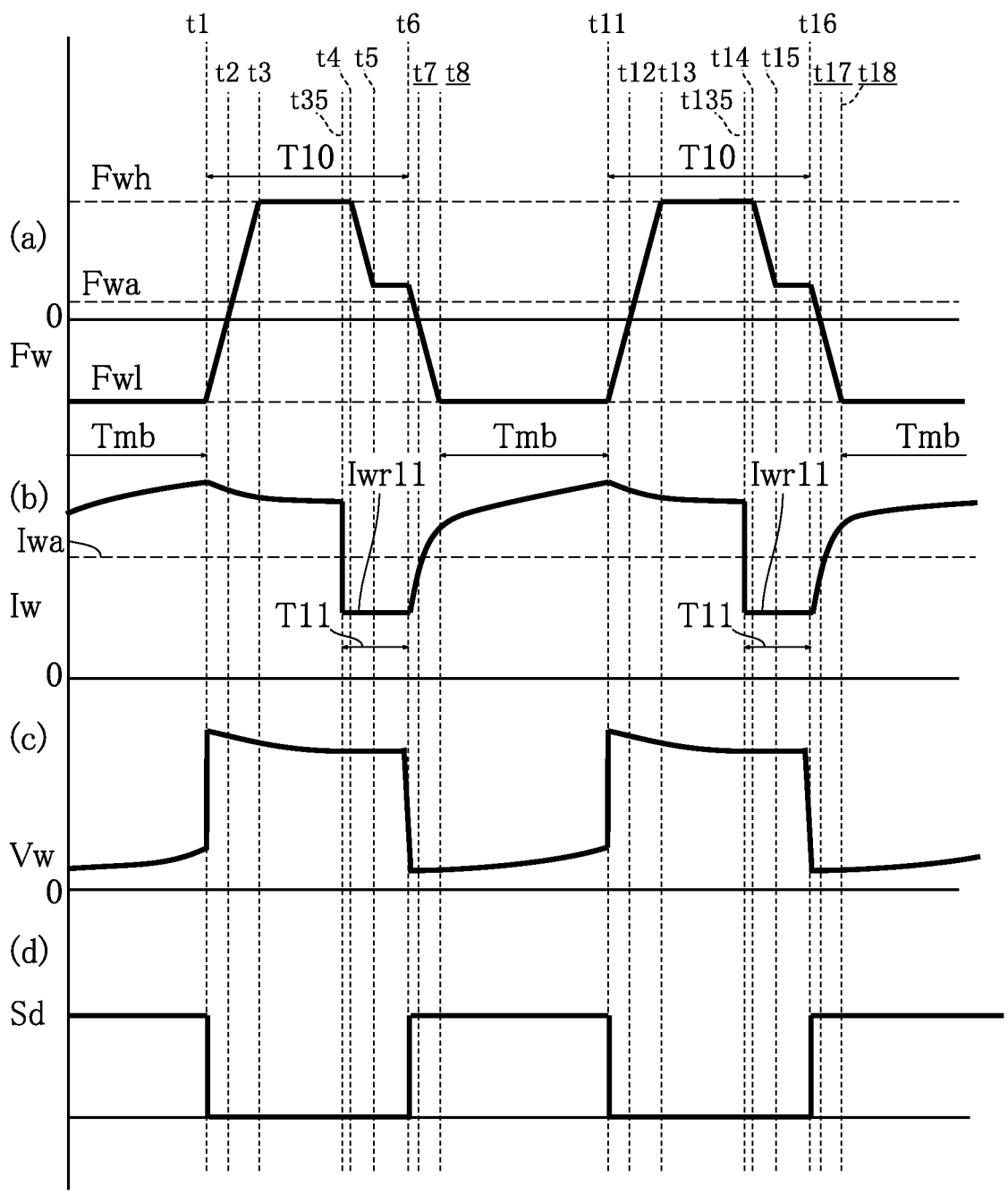
FIG. 9 is a timing chart showing an arc welding method based on the second embodiment according to the second aspect.

FIG. 9 is a timing chart showing an arc welding method based on the second embodiment according to the second aspect of the present invention. In this welding method, use is made of the arc welding apparatus A2'.

From time t1 to time t35, the same welding control as that of the arc welding method using the foregoing arc welding apparatus A1' is performed. Accordingly, the current suppression second period T11 is started at time t35. At time t4, the reverse transition period is started by the first feeding rate setting circuit FR. From time t4 to time t5, the first feeding rate setting circuit FR slows down the feeding rate Fw at an acceleration specified by the earlier transition acceleration setting signal Fa1. The period from time t4 to time t5 is the earlier transition part. When the forward direction is defined as positive and the reverse direction is defined as negative, the acceleration of the feeding rate Fw during the earlier transition part is a negative value. By the operation of the first feeding rate setting circuit FR, the acceleration for the earlier transition part is continued until time t5 at which the feeding rate Fw assumes a predetermined feeding rate.

From time t5 to time t6, the first feeding rate setting circuit FR controls the feeding rate Fw to achieve the acceleration specified by the moderate transition acceleration setting signal Fa2. The period from time t5 to time t6 is the moderate transition part. The absolute value of the acceleration of the feeding rate Fw during the moderate transition part is smaller than the absolute value of the acceleration during the earlier transition part. In the present embodiment, the acceleration during the moderate transition part is set to 0 by the moderate transition acceleration setting signal Fa2, so that the feeding rate Fw in the moderate transition part is constant. The feeding rate Fw in the moderate transition part is in the forward direction and larger than the average feeding rate Fwa in the illustrated example.

As a result of feeding the welding wire 1 in the forward direction, the welding wire 1 is short-circuited to the base material 2 at time t6. Thus, the shift from the arc period to the short-circuiting period occurs. In response to this, the welding voltage Vw drops sharply to the short-circuiting voltage of several volts as shown in (c) in FIG. 9, and the short-circuiting discrimination signal Sd turns to a high level as shown in (d). When the short-circuiting discrimination signal Sd is set to a high level at time t6, the first feeding rate setting circuit FR shifts to the control for the later transition part. During the later transition part, the first feeding rate setting circuit FR slows down the feeding rate Fw at an acceleration specified by the later transition acceleration setting signal Fa3. The acceleration of the feeding rate Fw during the later transition part is a negative value, and its absolute value is larger than the absolute value of the acceleration during the moderate transition part. At t6, as shown in (b), the current suppression second period T11 ends, and the power supply mode switching circuit SW switches the control mode to constant voltage control. The first feeding rate setting circuit FR continues the control for the later transition part through time t7 at which the feeding rate Fw assumes 0 until time t8 at which the feeding rate reaches the reverse maximum feeding rate Fwl.

From time t8 to time t11, the same welding control as that of the arc welding method using the foregoing arc welding apparatus A1' is performed. During the period from time t11 to time t18 including time t14 and time t15, the same welding control as that from time t1 to time t8 described above is performed.

Examples of the numerical values for the arc welding method of the present embodiment are given below. The forward maximum feeding rate Fwh may be 30 m/min to 100 m/min and about 80 m/min, for example. The reverse maximum feeding rate Fwl may be −30 m/min to −100 m/min and about −70 m/min, for example. The average feeding rate Fwa may be 1 m/min to 15 m/min and about 10 m/min, for example. The wire feed acceleration during the earlier transition part may be $-2\times10^6$ m/min$^2$ to $-15\times10^6$ m/min$^2$ and about $-6\times10^6$ m/min$^2$ for example, which is the acceleration at which speed change of 100 m/min for 1 ms occurs. The wire feed acceleration during the later transition part may be $-2\times10^6$ m/min$^2$ to $-15\times10^6$ m/min$^2$ and about $-6\times10^6$ m/min$^2$ for example. The feeding rate during the moderate transition part may be 0 m/min to 50 m/min and about 30 m/min, for example. The wire feed acceleration during the moderate transition part may be −30% to 30%, preferably −10% to 10% and about 5% of the wire feed acceleration during the earlier transition part or the later transition part. Other values may be the same as those of the arc welding method using the arc welding apparatus A1'.

The present embodiment also prevents generation of spatter at the starting point of the short-circuiting period. Further, in the present embodiment, after the forward maximum feeding rate Fwh is reached in the arc period and before the short-circuiting period starts, the process undergoes the earlier transition part and the subsequent moderate transition. By undergoing the earlier transition part, the feeding rate Fw is reduced from the forward maximum feeding rate Fwh. However, if the acceleration by the earlier transition acceleration setting signal Fa1 for the earlier transition part is maintained, the feeding rate Fw would unduly reach the reverse maximum feeding rate Fwl before short-circuiting occurs. Thus, in the present embodiment, the earlier transition part shifts to the moderate transition part before the short-circuiting period starts. The absolute value of the acceleration by the moderate transition acceleration setting signal Fa2 for the moderate transition part is smaller than the absolute value of the acceleration for the earlier transition part. That is, the state in which the feeding rate Fw is made lower than the forward maximum feeding rate Fwh by undergoing the earlier transition part is maintained for an additional period of time. When short-circuiting occurs, the feeding rate setting circuit FR shifts to the control for the later transition part. That is, using the short-circuiting as a trigger, the feeding rate of the welding wire 1 is caused to quickly approach the reverse maximum feeding rate Fwl.

By Setting the earlier transition part, the moderate transition part and the later transition part in this way, the time taken from the time (t6) at which short-circuiting occurs to the time (t8) at which the reverse maximum feeding rate Fwl is reached can be shortened while setting a higher feeding rate as the forward maximum feeding rate Fwh. A higher forward maximum feeding rate Fwh is more favorable for increasing the average feeding rate Fwa. When the average feeding rate Fwa is increased, the average welding current, which is the average value of the welding current Iw, can be increased. Moreover, increasing the average feeding rate Fwa means increasing the absolute value of the acceleration of the feeding rate Fw. Increased acceleration increases the load applied on the first and the second motors WM and WM2. In the present embodiment, the presence of the moderate transition part alleviates such a load increase due to acceleration/deceleration of the first motor WM in particular.

During the moderate transition part, the feeding rate Fw is a positive value. That is, in the moderate transition part, the welding wire 1 is fed in the forward direction at a speed lower than the forward maximum feeding rate Fwh. Thus, the welding wire 1 is prevented from separating from the base material 2 during the period until short-circuiting occurs (at time t6), so that failure of proper short-circuiting is avoided.

During the moderate transition part, the feeding rate Fw is maintained constant by setting the acceleration by the moderate transition acceleration setting signal Fa2 to 0. When short-circuiting occurs, a considerable change occurs in the welding voltage Vw and the welding current Iw. Keeping the feeding rate Fw constant is favorable for causing the short-circuiting to occur in a relatively stable state and at an intended timing.

Figure 10:
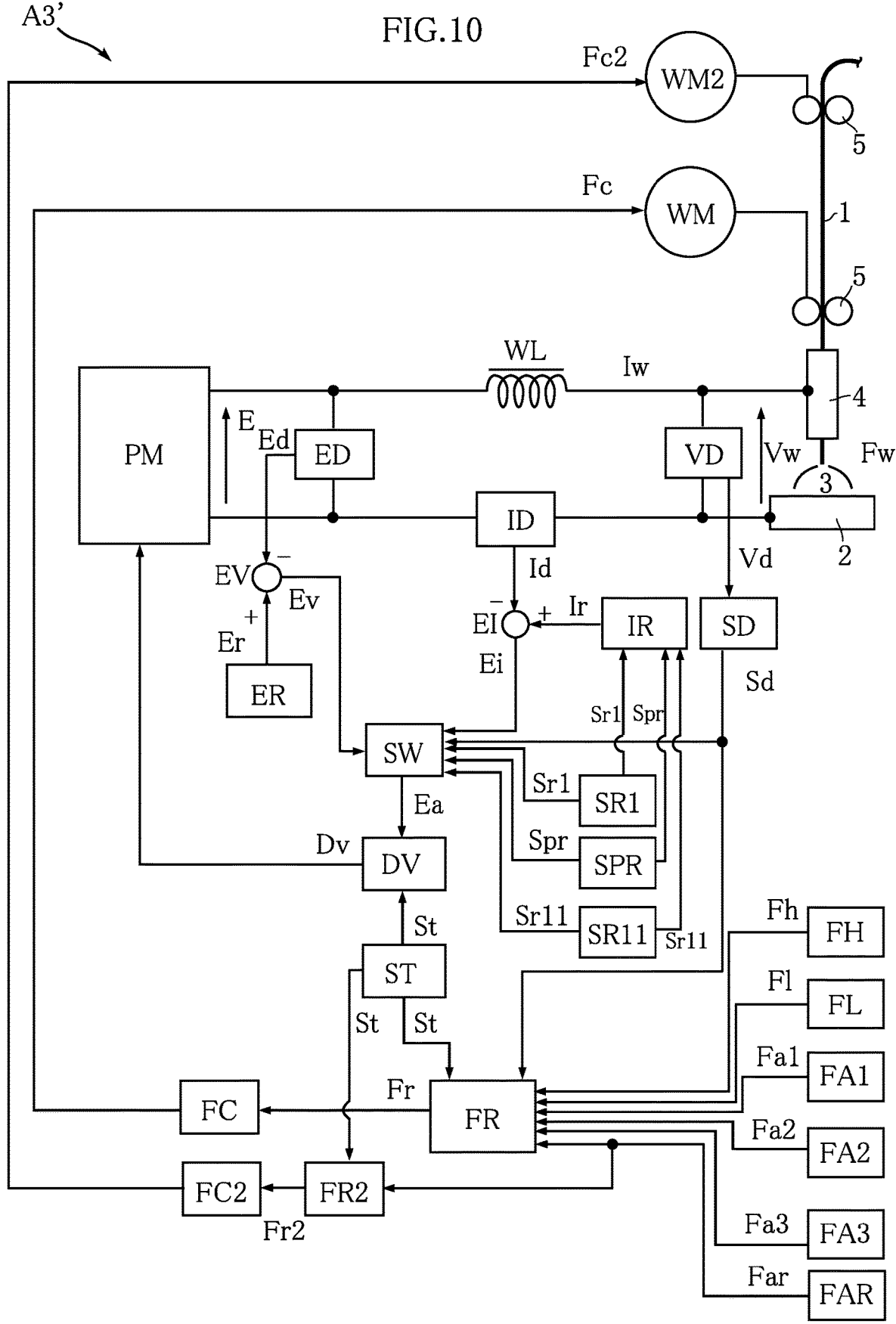
FIG. 10 is a block diagram showing an arc welding apparatus based on a third embodiment according to the second aspect.

FIG. 10 shows an arc welding apparatus based on a third embodiment according to the second aspect of the present invention. The arc welding apparatus A3' of the present embodiment is different from the foregoing arc welding apparatus A2' in that it further includes a preliminary period setting circuit SPR and a first period setting circuit SR1.

The preliminary period setting circuit SPR, the first period setting circuit SR1 and the second period setting circuit second SR11 of the present embodiment are the same as those of the embodiment described above. For example, the preliminary period setting circuit SPR outputs a preliminary period setting signal Spr, and in accordance with this signal, the value of the welding current Iw during the current suppression preliminary period Tp1 and the start timing of the current suppression preliminary period Tp1 are determined. The first period setting circuit SR1 outputs a first period setting signal Sr1, and in accordance with this signal, the value of the welding current Iw during the current suppression first period T1 and the length of the current suppression first period T1 are determined. The second period setting circuit SR11 outputs a second period setting signal Sr11, and in accordance with this signal, the value of the welding current Iw during the current suppression second period T11 and the start timing of the current suppression second period T11 are determined.

Figure 11:
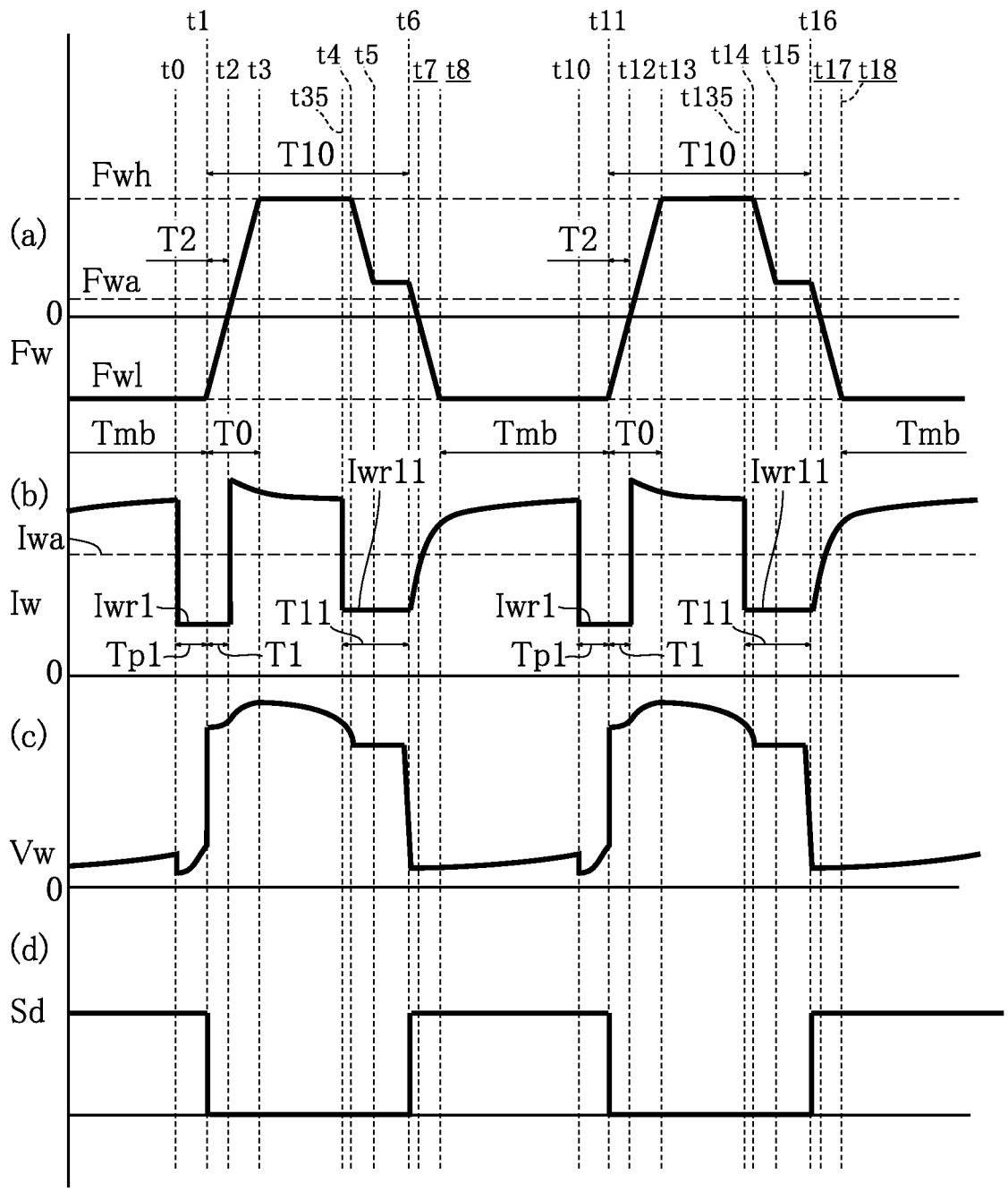
FIG. 11 is a timing chart showing an arc welding method based on the third embodiment according to the second aspect.

FIG. 11 is a timing chart showing an arc welding method based on the third embodiment according to the second aspect of the present invention. In this welding method, use is made of the arc welding apparatus A3'.

In the present embodiment, at time t0 before time t1, the control mode is switched to constant current control by the power supply mode switching circuit SW. Simultaneously with the start of the constant current control, the current suppression preliminary period Tp1 starts. The current suppression preliminary period Tp1 starts at time t0 and continues to time t1. The welding current Iw during the current suppression preliminary period Tp1 (suppressed welding current Iwr1) is set to be smaller than the average welding current Iwa, which is the time average of the welding current Iw during the unit welding step, and preferably 70% or less of the average welding current Iwa.

The current suppression first period T1 starts from time t1. The current suppression first period T1 is continuous with the current suppression preliminary period Tp1, and its starting point coincides with the starting point of the arc period. The welding current Iw during the current suppression first period T1 is the same as the suppressed welding current Iwr1.

At time t2, the feeding rate Fw becomes 0 and the forward feeding period starts. At time t2, based on the first period setting signal Sr1, the power supply mode switching circuit SW ends the current suppression first period T1, and the control mode shifts from constant current control to constant voltage control. When the length of the period from time t1, which is the starting point of the arc period, to time t2, at which the feeding rate Fw becomes 0, is defined as a time length T2, the ratio of the current suppression first period T1 to the time length T2 (T1/T2) is 1.0. It is preferable that T1/T2 is 0.8 or more.

At time t3, the feeding rate Fw reaches the forward maximum feeding rate Fwh. The first feeding rate setting circuit FR maintains the forward maximum feeding rate Fwh. The period during which the feeding rate changes from the reverse maximum feeding rate Fwl to the forward maximum feeding rate Fwh is defined as a forward transition period T0. The ratio (T1/T0) of the current suppression period T1 to the forward transition period T0 is set to be 0<T1/T0≤0.8.

As a result of feeding the welding wire 1 in the forward direction, the welding wire 1 is short-circuited to the base material 2 at time t6. Thus, the shift from the arc period to the short-circuiting period occurs. In response to this, the welding voltage Vw drops sharply to the short-circuiting voltage of several volts as shown in (c) in FIG. 11, and the short-circuiting discrimination signal Sd turns to a high level (short-circuit) as shown in (d). Thereafter, the welding current Iw gradually increases as shown in (b). When the short-circuiting discrimination signal Sd is set to a high level at time t6, the power supply driving circuit DV changes the welding current Iw through time t7 at which the feeding rate Fw assumes 0 until time t8 at which the feeding rate reaches the reverse maximum feeding rate Fwl.

After time t8, while the short-circuiting period started at time t6 is continued, the feeding rate Fw is maintained at the reverse maximum feeding rate Fwl so that the maximum reverse feeding period Tmb is maintained. At time t10, based on the preliminary period setting signal Spr, the power supply mode switching circuit SW switches the control mode from constant voltage control to constant current control, and another current suppression preliminary period Tp1 is started. From time t10, at which the current suppression preliminary period Tp1 is started, to time t10, the same control as that from time t0 to time t8 is performed. By periodically repeating such control, arc welding in which the short-circuiting period and the arc period alternate is realized.

Examples of the numerical values for the arc welding method of the present embodiment are given below. The length of a single unit welding step may be 8 ms to 20 ms and about 10 ms, for example. The length of a single short-circuiting period may be 2 ms to 10 ms and about 4 ms, for example. The length of a single arc period may be 3 ms to 15 ms and about 6 ms, for example. The forward maximum feeding rate Fwh may be 30 m/min to 100 m/min and about 80 m/min, for example. The reverse maximum feeding rate Fwl may be −30 m/min to −100 m/min and about −70 m/min, for example. The average feeding rate may be 1 m/min to 15 m/min and about 10 m/min, for example. The average welding current Iwa may be 30 A to 350 A and about 250 A, for example. The forward transition period T0 may be 1 ms to 10 ms and about 3 ms, for example. The time length T2 may be 0.5 ms to 5 ms and about 3 ms, for example. The current suppression preliminary period Tp1 may be 0.1 ms to 1.5 ms and about 1 ms, for example. The current suppression first period T1 may be 0.1 ms to 2 ms and about 1 ms, for example. The suppressed welding current Iwr1 may be 20 A to 150 A and about 50 A, for example. Other values may be the same as those of the arc welding methods using the arc welding apparatus A1' and the arc welding apparatus A2'.

The present embodiment also prevents generation of spatter at the starting point of the short-circuiting period. Further, the current suppression first period T1 is set in the forward transition period T0. During the current suppression first period T1, the welding current Iw is set to the suppressed welding current Iwr1 smaller than the average welding current Iwa. Thus, in the state in which an arc is generated in the forward transition period T0, the arc force acting on the droplet is intentionally weakened. This prevents the droplet from rising and facilitates proper transfer of the droplet to the base material 2. The current suppression first period T1 is 0.8 times the forward transition period T0 at most. This prevents the arc force from being undesirably weakened throughout the arc period.

Further, in the present embodiment, the ratio (T1/T2) of the current suppression first period T1 to the time length T2 is 0.8 or more. Thus, the welding current Iw is kept suppressed to the suppressed welding current Iwr1 to immediately before the time (t2) when feeding of the welding wire 1 shifts from the reverse feeding state (t1) to the stopped state. This is favorable for proper droplet transfer.

Moreover, in the present embodiment, the starting point of the current suppression first period T1 coincides with the starting point of the forward transition period T0. This means that the welding current Iw is set to the suppressed welding current Iwr1 when the forward transition period T0 is started. Thus, proper droplet transfer is realized simultaneously with the start of the arc period.

Since the suppressed welding current Iwr1 is 70% or less of the average welding current Iwa, rising of the droplet is reliably prevented.

Moreover, in the present embodiment, the current suppression preliminary period Tp1 is provided prior to and continuous with the current suppression first period T1. Thus, immediately before the shift from the short-circuiting period to the arc period occurs, the welding current Iw is set to a value smaller than the average welding current Iwa. This allows more reliable droplet transfer.

Figure 12:
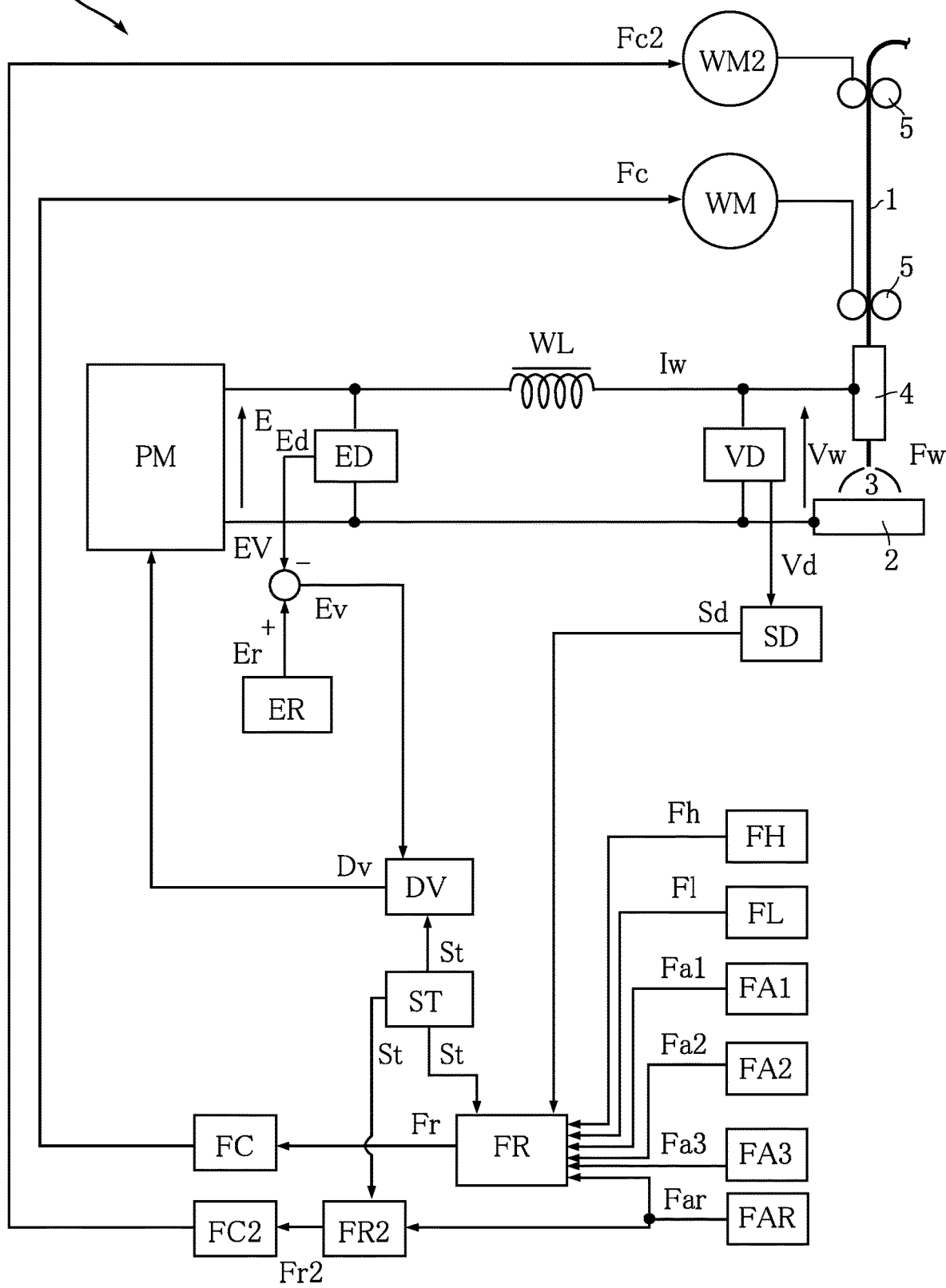
FIG. 12 is a block diagram showing an arc welding apparatus based on a first embodiment according to a third aspect.

FIG. 12 is a block diagram showing an arc welding apparatus based on a first embodiment according to a third aspect of the present invention. The arc welding apparatus A1" of the present embodiment includes a power supply circuit PM, an output voltage detection circuit ED, a welding voltage detection circuit VD, an output voltage setting circuit ER, a voltage error amplifying circuit EV, a short-circuit discrimination circuit SD, a power supply driving circuit DV, a welding start circuit ST, a maximum forward feeding rate setting circuit FH, a maximum reverse feeding rate setting circuit FL, an earlier transition acceleration setting circuit FA1, a moderate transition acceleration setting circuit FA2, a later transition acceleration setting circuit FA3, an average feeding rate setting circuit FAR, a first feeding rate setting circuit FR, a second feeding rate setting circuit FR2, a first feed control circuit FC, a second feed control circuit FC2, a welding torch 4 and a roller 5. The arc welding apparatus A1" may be provided with a robot for moving the welding torch 4 along a desired path.

The power supply circuit PM uses a commercial power supply of 3-phase 200 V as an input and performs output control by inverter control, for example, based on a driving signal Dv to output an output voltage E. The power supply circuit PM includes a primary rectifier that rectifies the commercial power supply to a direct current, a smoothing capacitor that smoothes the direct current, an inverter circuit that converts the smoothed direct current to a high-frequency alternating current, a high-frequency transformer that steps down the high-frequency alternating current to a voltage appropriate for welding, and a secondary rectifier that rectifies the stepped-down high-frequency alternating current to a direct current. The arc welding apparatus A1" includes a reactor WL to smooth the output voltage E. For example, the inductance value of the reactor WL is 200 μH.

The first motor WM and the second motor WM2 receive a first feed control signal Fc and a second feed control signal Fc2, respectively, and periodically repeat forward feeding and reverse feeding to feed the welding wire 1 at a feeding rate Fw. Specifically, in this process, the first motor WM is controlled to repeat forward feeding and reverse feeding, whereas the second motor WM2 is controlled to perform forward feeding alone. It is desirable that the first motor WM and the second motor WM2 (the first motor WM in particular) are highly responsive (i.e., the transient response period is short). In the present embodiment again, similarly to the foregoing embodiments, a push-pull type wire feeder that uses two motors is provided.

The output voltage setting circuit ER outputs a predetermined output voltage setting signal Er. The output voltage detection circuit ED detects the output voltage E and smoothes the voltage to output an output voltage detection signal Ed.

The voltage error amplifying circuit EV receives the output voltage setting signal Er and the output voltage detection signal Ed. The voltage error amplifying circuit EV amplifies the difference between the output voltage setting signal Er and the output voltage detection signal Ed and outputs a voltage error amplified signal Ev. The voltage error amplifying circuit EV is a circuit for constant voltage control of the power supply circuit PM.

The welding voltage detection circuit VD detects the welding voltage Vw to output a voltage detection signal Vd. The short-circuit discrimination circuit SD receives a voltage detection signal Vd and outputs a short-circuiting discrimination signal Sd. When the voltage detection signal Vd is lower than a predetermined discrimination value (e.g. 10V), the short-circuit discrimination circuit SD determines that the process is in the short-circuiting period (short circuit stage) and sets the short-circuiting discrimination signal Sd to a high level. When the voltage detection signal Vd is not lower than the predetermined discrimination value, the short-circuit discrimination circuit SD determines that the process is in the arc period (arc stage) and sets the short-circuiting discrimination signal Sd to a low level.

The welding start circuit ST outputs a welding start signal St. The welding start circuit ST sets the welding start signal St to a high level in activating the welding power source.

The power supply driving circuit DV receives the voltage error amplified signal Ev and the welding start signal St to output the driving signal Dv. When the welding start signal St is at a high level (welding start), the power supply driving circuit DV outputs the driving signal Dv for performing PWM modulation control based on the voltage error amplified signal Ev. The driving signal Dv drives the inverter circuit within the power supply circuit PM.

The average feeding rate setting circuit FAR outputs an average feeding rate setting signal Far.

The maximum forward feeding rate setting circuit FH outputs a maximum forward feeding rate setting signal Fh that specifies the maximum value of the feeding rate Fw in the forward direction. For example, the maximum forward feeding rate setting signal Fh instructs the feeding rate corresponding to the difference between the maximum feeding rate of the feeding rate Fw in the forward direction and the average feeding rate by the average feeding rate setting signal Far.

The maximum reverse feeding rate setting circuit FL outputs a maximum reverse feeding rate setting signal Fl that specifies the maximum value of the feeding rate Fw in the reverse direction. For example, the maximum reverse feeding rate setting signal Fl instructs the feeding rate corresponding to the difference between the maximum feeding rate of the feeding rate Fw in the reverse direction and the average feeding rate by the average feeding rate setting signal Far.

The earlier transition acceleration setting circuit FA1 outputs an earlier transition acceleration setting signal Fa1 that specifies the acceleration of the feeding rate Fw during an earlier transition part set within a transition period (described later). The moderate transition acceleration setting circuit FA2 outputs a moderate transition acceleration setting signal Fa2 that specifies the acceleration of the feeding rate Fw during a moderate transition part set within the transition period. The later transition acceleration setting circuit FA3 outputs a later transition acceleration setting signal Fa3 that specifies the acceleration of the feeding rate Fw during a later transition part set within the transition period.

The first feeding rate setting circuit FR receives the average feeding rate setting signal Far, the maximum forward feeding rate setting signal Fh, the maximum reverse feeding rate setting signal Fl, the earlier transition acceleration setting signal Fa1, the moderate transition acceleration setting signal Fa2 and the later transition acceleration setting signal Fa3 to output a first feeding rate setting signal Fr. The second feeding rate setting circuit FR2 receives the average feeding rate setting signal Far to output a second feeding rate setting signal Fr2.

The first feed control circuit FC receives the first feeding rate setting signal Fr and outputs a first feed control signal Fc to the first motor WM. The first feed control signal Fc causes the first motor WM to rotate to feed the welding wire 1 at the feeding rate instructed by the first feeding rate setting signal Fr.

The second feed control circuit FC2 receives the second feeding rate setting signal Fr2 and outputs the second feed control signal Fc2 to the second motor WM2. The second feed control signal Fc2 causes the second motor WM2 to rotate to feed the welding wire 1 at the feeding rate instructed by the second feeding rate setting signal Fr2.

The feeding rate Fw at which the welding wire 1 is actually fed from the welding torch 4 depends on the driving force applied by each of the first motor WM and the second motor WM2 to the welding wire 1.

Figure 13:
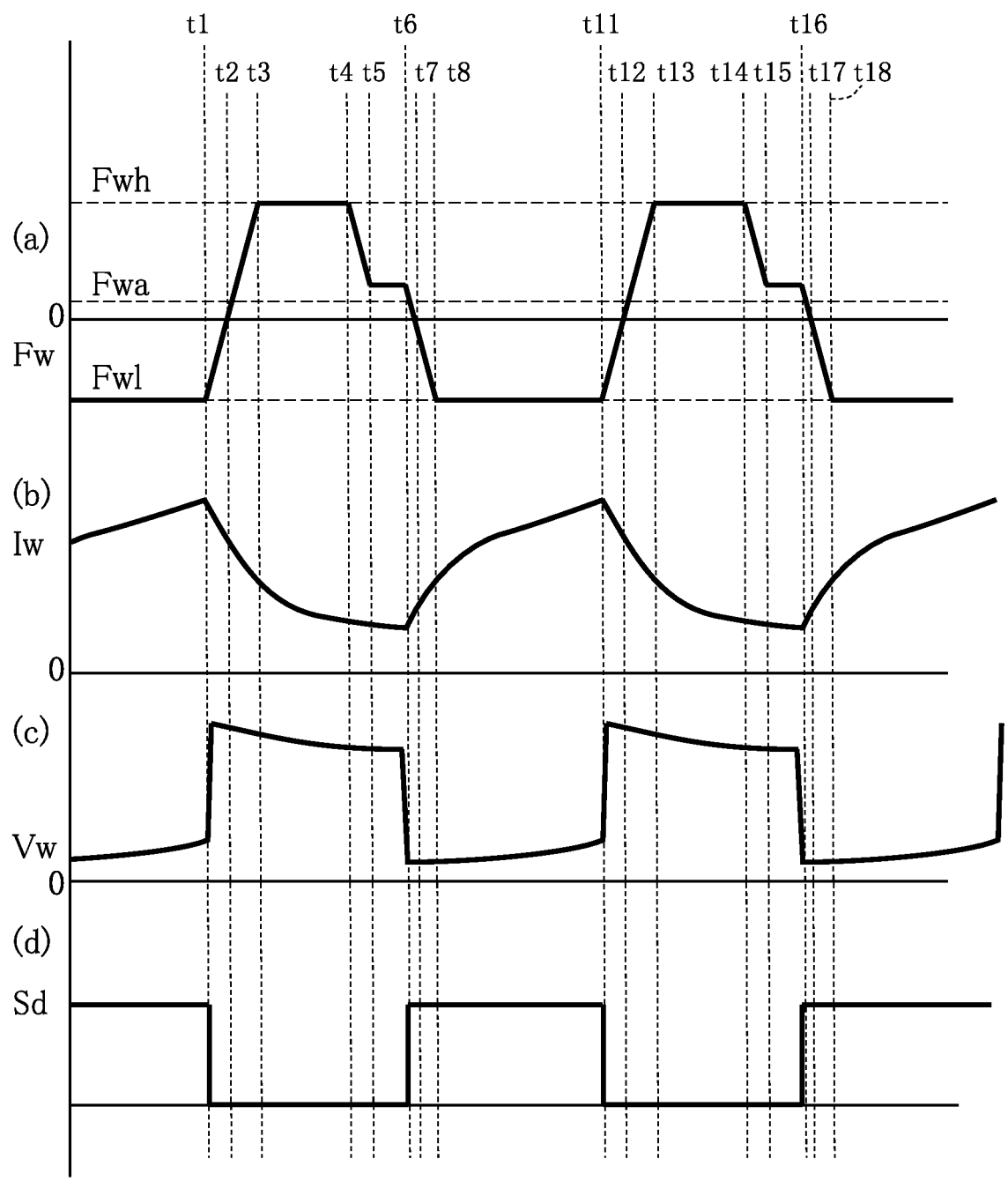
FIG. 13 is a timing chart showing an arc welding method based on the first embodiment according to the third aspect.

FIG. 13 a timing chart showing an arc welding method based on the first embodiment according to the third aspect of the present invention. In this welding method, use is made of the arc welding apparatus A1" described above. In the figure, (a) indicates the change over time of the feeding rate Fw of the wire, (b) indicates the change over time of the welding current Iw, (c) indicates the change over time of the welding voltage Vw, and (d) indicates the change over time of the short-circuiting discrimination signal Sd.

The feeding rate Fw indicated by (a) in FIG. 13 is determined based on the first feeding rate setting signal Fr and the second feeding rate setting signal Fr2. The first feeding rate setting signal Fr drives the first motor WM to feed the welding wire 1 at a feeding rate that has a generally trapezoidal waveform, based on the maximum forward feeding rate setting signal Fh, the maximum reverse feeding rate setting signal Fl, the earlier transition acceleration setting signal Fa1, the moderate transition acceleration setting signal Fa2 and the later transition acceleration setting signal Fa3. On the other hand, the second feeding rate setting signal Fr2 drives the second motor WM2 to feed the welding wire 1 at a constant feeding rate corresponding to the average rate in accordance with the average feeding rate setting signal Far. As a result, the feeding rate Fw of the wire has a trapezoidal waveform shifted toward the forward side by an amount corresponding to the value of the average feeding rate setting signal Far. The amplitude on the forward side by the maximum forward feeding rate setting signal Fh and the amplitude on the reverse side by the maximum reverse feeding rate setting signal Fl are the same.

As indicated by (a) in FIG. 13, the waveform of the feeding rate Fw includes a forward feeding period and a reverse feeding period that alternate with each other with respect to the reference line corresponding to speed 0. The period from time t2 to time t7 is the forward feeding period, whereas the period from time t7 to time t12 is the reverse feeding period. As will be described later, the period from time t1 to time t6 is an arc period, whereas the period from time t6 to time t11 is a short-circuiting period. A single arc period and a single short-circuiting period that are continuous with each other constitute a single unit welding step. In the arc welding method according to the present embodiment, a plurality of unit welding steps are repetitively performed.

The timing chart of FIG. 13 corresponds to a steady welding period. An unsteady welding period may be provided before or after the steady welding period. For example, an arc start period for smoothly generating an arc may be provided before the steady welding period. A welding ending period for properly ending the welding may be provided after the steady welding period.

Immediately before time t1, the feeding rate Fw is the reverse maximum feeding rate Fwl and the welding wire is short-circuited. At time t1, the short-circuiting condition ends and an arc 3 is generated. In response to this, as shown in (c) in FIG. 13, the welding voltage Vw sharply increases to the arc voltage of several tens of volts, and the short-circuiting discrimination signal Sd turns to a low level as shown in (d). Thereafter, the welding current Iw gradually decreases as shown in (b). When the short-circuiting discrimination signal Sd is set to the low level, the first feeding rate setting circuit FR outputs a first feeding rate setting signal Fr to increase the feeding rate Fw toward the forward maximum feeding rate Fwh set by the maximum forward feeding rate setting signal Fh. The second feeding rate setting circuit FR2 controls the second motor WM2 to generate a constant driving force for feeding the welding wire 1 at the average feeding rate Fwa in accordance with the instruction by the average feeding rate setting signal Far.

At time t2, the feeding rate Fw becomes 0 and the forward feeding period starts. At time t3, the feeding rate Fw reaches the forward maximum feeding rate Fwh. The first feeding rate setting circuit FR maintains the forward maximum feeding rate Fwh for a predetermined period.

At time t4, the transition period is started by the first feeding rate setting circuit FR. From time t4 to time t5, the first feeding rate setting circuit FR slows down the feeding rate Fw at an acceleration specified by the earlier transition acceleration setting signal Fa1. The period from time t4 to time t5 is the earlier transition part. When the forward direction is defined as positive and the reverse direction is defined as negative, the acceleration of the feeding rate Fw during the earlier transition part is a negative value. By the operation of the first feeding rate setting circuit FR, the acceleration for the earlier transition part is continued until time t5 at which the feeding rate Fw assumes a predetermined feeding rate.

From time t5 to time t6, the first feeding rate setting circuit FR controls the feeding rate Fw to achieve the acceleration specified by the moderate transition acceleration setting signal Fa2. The period from time t5 to time t6 is the moderate transition part. The absolute value of the acceleration of the feeding rate Fw during the moderate transition part is smaller than the absolute value of the acceleration during the earlier transition part. The acceleration during the moderate transition part is set to 0 by the moderate transition acceleration setting signal Fa2, so that the feeding rate Fw in the moderate transition part is constant. The feeding rate Fw in the moderate transition part is in the forward direction and larger than the average feeding rate Fwa.

As a result of feeding of the welding wire 1 in the forward direction, the welding wire 1 is short-circuited to the base material 2 at time t6. Thus, the shift from the arc period to the short-circuiting period occurs. In response to this, the welding voltage Vw drops sharply to the short-circuiting voltage of several volts as shown in (c) in FIG. 13, and the short-circuiting discrimination signal Sd turns to a high level (short-circuit) as shown in (d). Thereafter, the welding current Iw gradually increases as shown in (b). When the short-circuiting discrimination signal Sd is set to a high level at time t6, the first feeding rate setting circuit FR shifts to the control for the later transition part. During the later transition part, the first feeding rate setting circuit FR slows down the feeding rate Fw at an acceleration specified by the later transition acceleration setting signal Fa3. The acceleration of the feeding rate Fw during the later transition part is a negative value, and its absolute value is larger than the absolute value of the acceleration during the moderate transition part. The first feeding rate setting circuit FR continues the control for the later transition part through time t7 at which the feeding rate Fw assumes 0 until time t8 at which the feeding rate reaches the reverse maximum feeding rate Fwl.

The first feeding rate setting circuit FR outputs the first feeding rate setting signal Fr such that the reverse maximum feeding rate Fwl by the maximum reverse feeding rate setting signal Fl is reached at time t8.

After time t8, while the short-circuiting period started at time t6 is continued, the feeding rate Fw is maintained at the reverse maximum feeding rate Fwl. From time t11, at which the shift from the short-circuiting period to the arc period has occurred, to time t18, the same control as that from time t1 to time t8 is performed. By periodically repeating such control, arc welding in which the short-circuiting period and the arc period alternate is performed.

Examples of the numerical values for the arc welding method of the present embodiment are given below. The length of a single unit welding step may be 8 ms to 20 ms and about 10 ms, for example. The length of a single short-circuiting period may be 2 ms to 10 ms and about 4 ms, for example. The length of a single arc period may be 3 ms to 15 ms and about 6 ms, for example. The forward maximum feeding rate Fwh may be 30 m/min to 100 m/min and about 80 m/min, for example. The reverse maximum feeding rate Fwl may be −30 m/min to −100 m/min and about −70 m/min, for example. The average feeding rate Fwa may be 1 m/min to 15 m/min and about 10 m/min, for example. The wire feed acceleration during the earlier transition part may be $-2 \times 10^6$ m/min$^2$ to $-15 \times 10^6$ m/min$^2$ and about $-6 \times 10^6$ m/min$^2$ for example. The wire feed acceleration during the later transition part may be $-2 \times 10^6$ m/min$^2$ to $-15 \times 10^6$ m/min$^2$ and about $-6 \times 10^6$ m/min$^2$ for example. The feeding rate during the moderate transition part may be 0 m/min to 50 m/min and about 30 m/min, for example. The wire feed acceleration during the moderate transition part may be −30% to 30%, preferably −10% to 10% and about 5% of the wire feed acceleration during the earlier transition part or the later transition part. The average welding current Iwa, which is the time average of the welding current Iw, may be 30 A to 350 A and about 250 A, for example.

The advantages of the arc welding apparatus A1″ and the arc welding method of the present embodiment are described below.

In the present embodiment, after the forward maximum feeding rate Fwh is reached in the arc period and before the short-circuiting period starts, the process undergoes the earlier transition part and the subsequent moderate transition. By undergoing the earlier transition part, the feeding rate Fw is reduced from the forward maximum feeding rate Fwh. If the acceleration by the earlier transition acceleration setting signal Fa1 for the earlier transition part is maintained, the feeding rate Fw may reach the reverse maximum feeding rate Fwl before short-circuiting occurs. In the present embodiment, however, the earlier transition part shifts to the moderate transition part before the short-circuiting period starts. The absolute value of the acceleration by the moderate transition acceleration setting signal Fa2 for the moderate transition part is smaller than the absolute value of the acceleration for the earlier transition part. That is, the state in which the feeding rate Fw is made lower than the forward maximum feeding rate Fwh by undergoing the earlier transition part is maintained for a longer time. When short-circuiting occurs, the feeding rate setting circuit FR shifts to the control for the later transition part. That is, using the short-circuiting as a trigger, the feeding rate of the welding wire 1 is caused to quickly approach the reverse maximum feeding rate Fwl.

By Setting the earlier transition part, the moderate transition part and the later transition part in this way, the time taken from the time (t6) at which short-circuiting occurs to the time (t8) at which the reverse maximum feeding rate Fwl is reached can be shortened while setting a higher feeding rate as the forward maximum feeding rate Fwh. A higher forward maximum feeding rate Fwh is more favorable for increasing the average feeding rate Fwa. When the average feeding rate Fwa is increased, the average welding current, which is the average value of the welding current Iw, can be increased. Moreover, increasing the average feeding rate Fwa means increasing the absolute value of the acceleration of the feeding rate Fw. Increased acceleration increases the load applied on the first and the second motors WM and WM2. In the present embodiment, the presence of the moderate transition part alleviates such a load increase due to acceleration/deceleration of the first motor WM in particular.

During the moderate transition part, the feeding rate Fw is a positive value. That is, in the moderate transition part, the welding wire 1 is fed in the forward direction at a speed lower than the forward maximum feeding rate Fwh. Thus, the welding wire 1 is prevented from separating from the base material 2 during the period until short-circuiting occurs (at time t6), so that a failure of proper short-circuiting is avoided.

During the moderate transition part, the feeding rate Fw is maintained constant by setting the acceleration by the moderate transition acceleration setting signal Fa2 to 0. When short-circuiting occurs, a considerable change occurs in the welding voltage Vw and the welding current Iw. Keeping the feeding rate Fw constant is favorable for causing the short-circuiting to occur in a relatively stable state and at an intended timing.

FIGS. 14-17 show variations of the foregoing embodiments and other embodiments.

Figure 14:
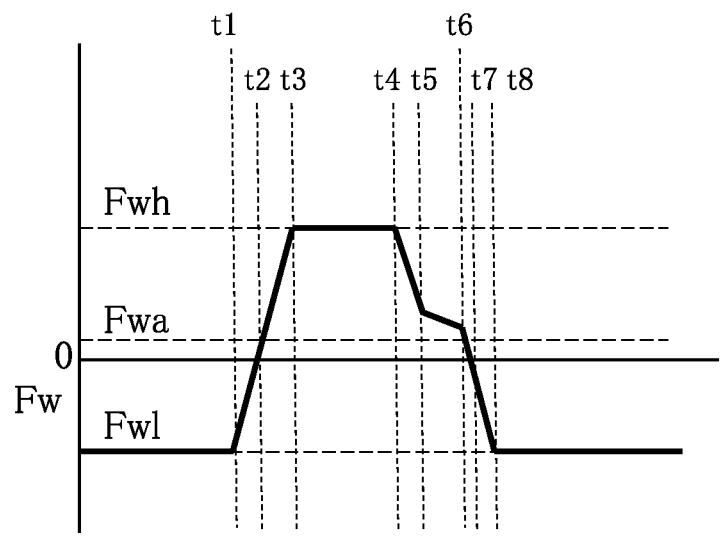
FIG. 14 is a timing chart showing a variation of an arc welding method based on the first embodiment according to the third aspect.

FIG. 14 is a timing chart showing a variation of the arc welding method based on the first embodiment according to the third aspect of the present invention. In this variation, the acceleration of the feeding rate Fw during the moderate transition part from time t5 to time t6 is a negative value, which is smaller than 0. Here, the absolute value of the acceleration during the moderate transition part is smaller than both of the absolute values of the acceleration during the earlier transition part from time t4 to time t5 and the acceleration during the later transition part from time t6 to time t8.

In this variation, the feeding rate Fw of the welding wire 1 being fed in the forward direction is gradually reduced during the moderate transition part as well. However, the deceleration during the moderate transition part, i.e., the degree with which the feeding rate Fw shifts from the forward feeding toward the reverse feeding is smaller than the degrees during the earlier transition part and the later transition part.

As will be understood from this variation, the acceleration of the feeding rate Fw during the moderate transition part is not limited to 0 and may be a negative value smaller than 0.

Figure 15:
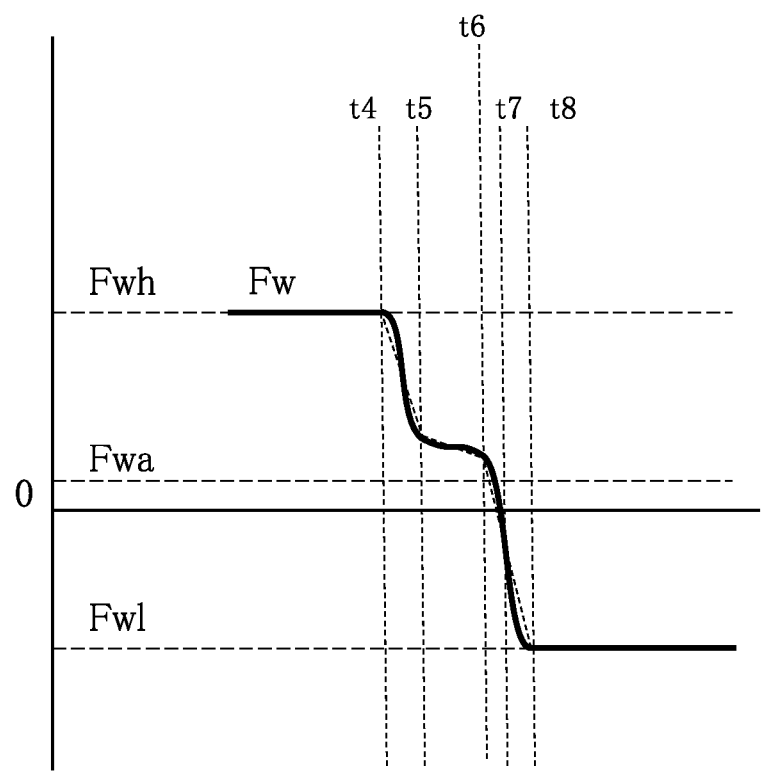
FIG. 15 is a timing chart showing another variation of the arc welding method based on the first embodiment according to the third aspect.

FIG. 15 is a timing chart showing another variation of the arc welding method. In this variation, the acceleration of the feeding rate Fw is not constant but changes with time during each of the earlier transition part from time t4 to time t5, the moderate transition part from time t5 to time t6, and the later transition part from time t6 to time t7.

In this variation again, the absolute value of the average acceleration during the moderate transition part is smaller than both of the absolute values of the average acceleration during the earlier transition part and the average acceleration during the later transition part. Note that, in all the foregoing examples, the acceleration of the feeding rate Fw is constant during each of the earlier transition part, the moderate transition part and the later transition part. Accordingly, the relationship between the accelerations of these transition parts in the foregoing examples is equivalent to the relationship between the average accelerations of the transition parts.

As will be understood from this variation, the acceleration of the feeding rate Fw may not be constant during each of the earlier transition part, the moderate transition part and the later transition part. Also, the acceleration may be constant in any of the transition parts and may vary in the remaining transition part or parts. This holds true for the embodiments described below.

Figure 16:
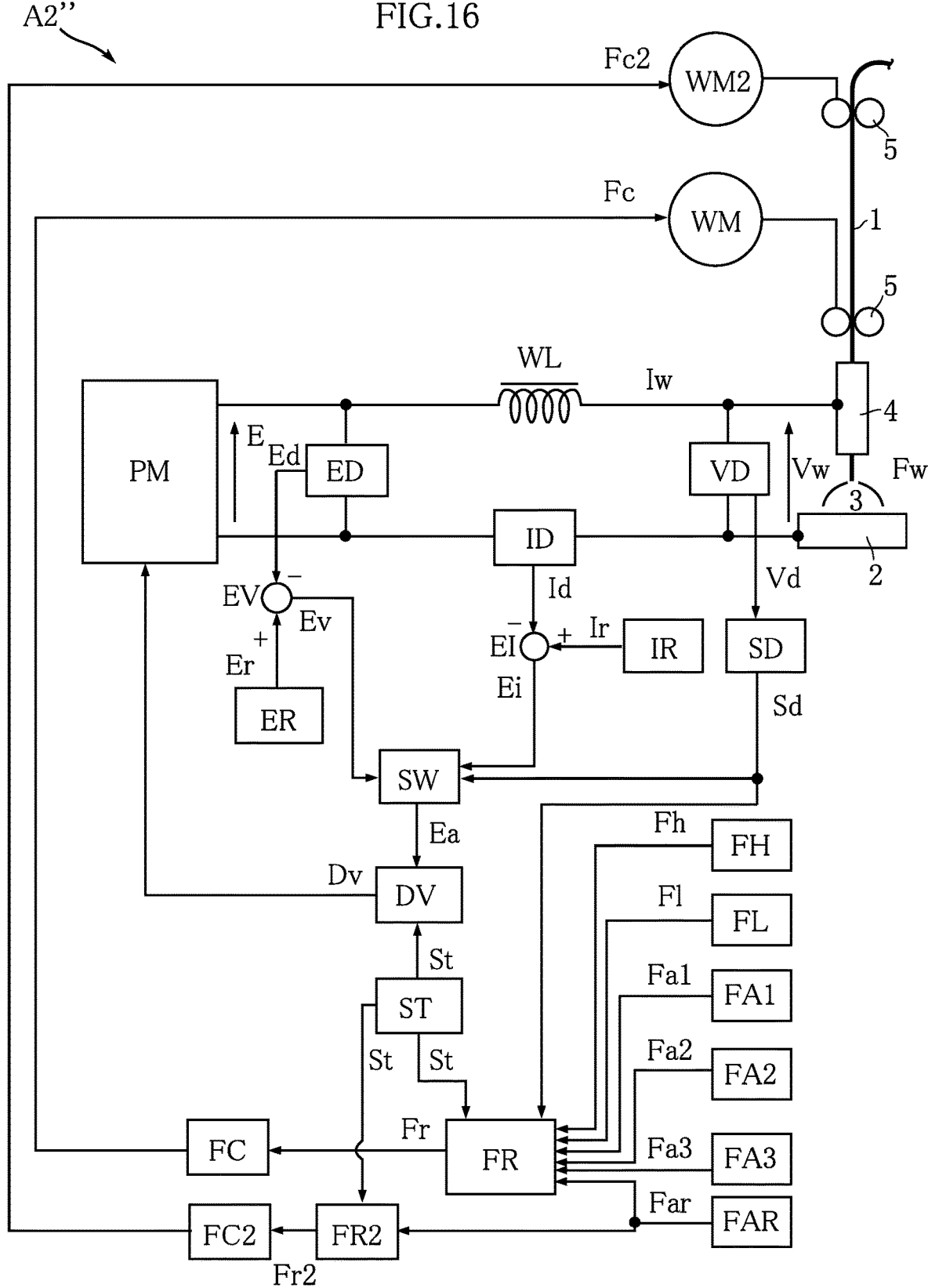
FIG. 16 is a block diagram showing an arc welding apparatus based on a second embodiment according to the third aspect.

FIG. 16 shows an arc welding apparatus based on a second embodiment according to the third aspect of the present invention. The arc welding apparatus A2" of this embodiment is different from the arc welding apparatus A1" in that it further includes a current detection circuit ID, an output current setting circuit IR, a current error amplifying circuit EI and a power supply mode switching circuit SW.

The current detection circuit ID detects the welding current Iw to output a current detection signal Id.

The output current setting circuit IR outputs an output current setting signal Ir. The output current setting signal Ir is used for performing constant current control when switching between the short-circuiting period and the arc period occurs.

The current error amplifying circuit EI receives the output current setting signal Ir and the current detection signal Id and outputs a current error amplified signal Ei. The current error amplified signal Ei is obtained by amplifying the difference between the output current setting signal Ir and the current detection signal Id.

The power supply mode switching circuit SW receives the current error amplified signal Ei, the voltage error amplified signal Ev and the short-circuiting discrimination signal Sd and outputs an error amplified signal Ea. Based on the short-circuiting discrimination signal Sd and so on, the power supply mode switching circuit SW identifies the period before the time point at which switching between the arc period and the short-circuiting period occurs. To perform constant current control, the power supply mode switching circuit SW outputs the current error amplified signal Ei as the error amplified signal Ea. At other timing, the voltage error amplified signal Ev is outputted as the error amplified signal Ea.

Figure 17:
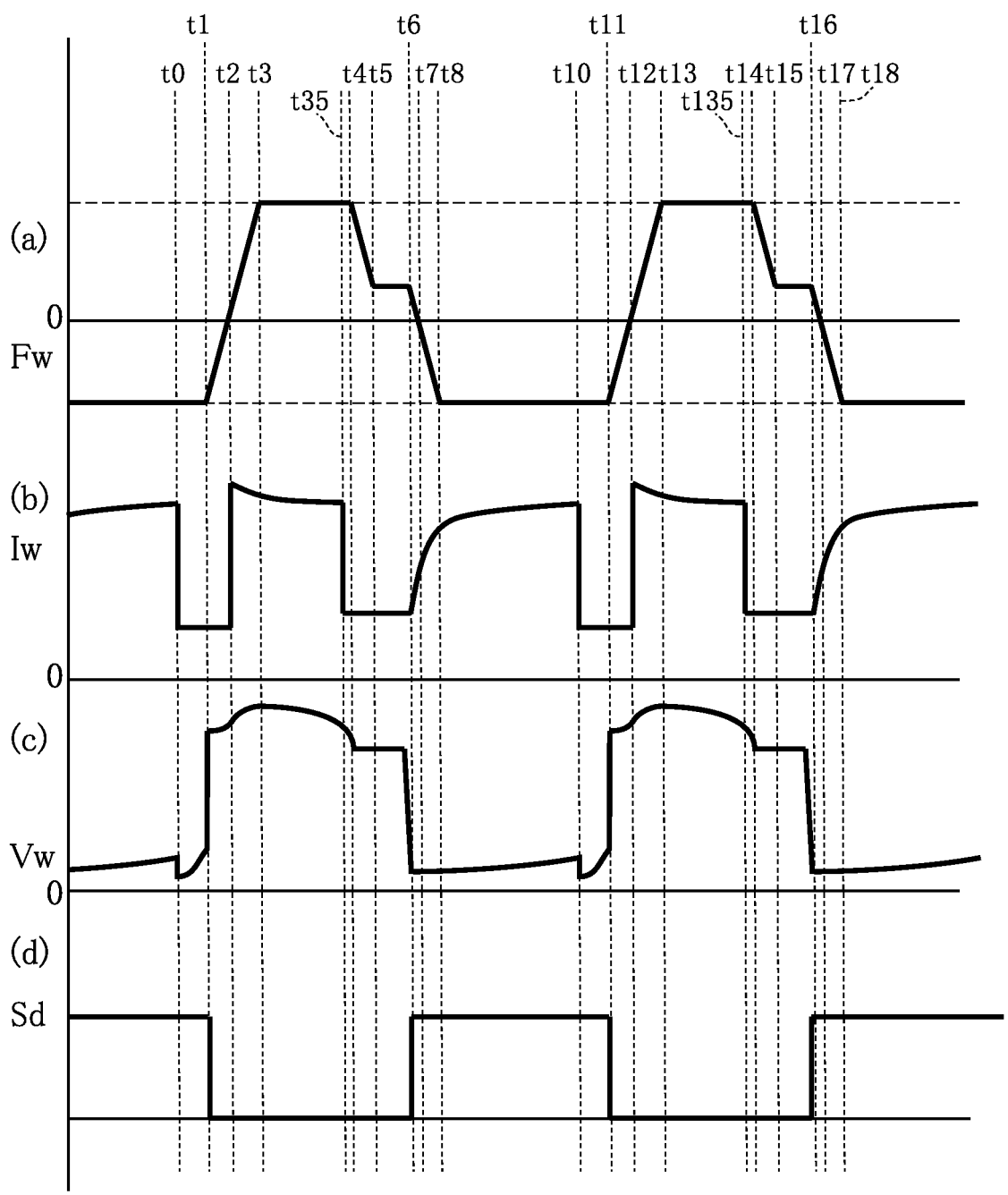
FIG. 17 is a timing chart showing an arc welding method based on the second embodiment according to the third aspect.

FIG. 17 is a timing chart showing an arc welding method based on the second embodiment according to the third aspect of the present invention. In this welding method, use is made of the arc welding apparatus A2".

At time t0 before time t1, the control mode is switched to constant current control by the power supply mode switching circuit SW. At that time, the welding current Iw is reduced to the value set by the output current setting signal Ir. This welding current Iw is smaller than the average welding current, which is the time average of the welding current Iw during the unit welding step. With the welding current Iw controlled to be constant, the short-circuiting condition ends and an arc 3 is generated at time t1. In response to this, from time t1 to time t3, the feeding rate Fw is controlled in the same manner as the first embodiment described above. Also, in the present embodiment, the power supply mode switching circuit SW performs switching from constant current control to constant voltage control at time t2.

After the feeding rate Fw reaches the forward maximum feeding rate Fwh at time t3, at the time point (t35) when a predetermined time has elapsed since arc generation (the short-circuiting discrimination signal Sd is turned to a low level), the power supply mode switching circuit performs switching from constant voltage control to constant current control. The welding current Iw at that time may be smaller than the average welding current. The constant current control maybe continued until short-circuiting occurs at time t6. When the short-circuiting period is started at time t6, the power supply mode switching circuit performs switching from constant current control to constant voltage control.

According to this embodiment again, the average feeding rate can be appropriately increased to increase the welding current. Note that power supply from the power supply circuit PM may be performed by appropriately combining constant voltage control and constant current control.

The arc welding apparatus and arc welding method according to the present invention are not limited to the foregoing embodiments. The specific configuration of the arc welding apparatus and arc welding method according to the present invention may be varied in design in many ways.

The invention claimed is:

1. An arc welding apparatus comprising:
a power supply that supplies welding power to a path including a welding wire and a base material;
a wire feeder that feeds the welding wire at a wire feeding rate in a forward direction toward the base material and in a reverse direction away from the base material; and
a controller that controls the power supply and the wire feeder such that a plurality of unit welding steps are performed, each of the unit welding steps including a short circuit stage in which the welding wire and the base material are short-circuited and an arc stage in which an arc is generated between the welding wire and the base material,
wherein the arc stage comprises a maximum forward feeding period in which the wire feeding rate is kept constant at a maximum forward feeding rate in the forward direction,
wherein, when a first transition period is defined as a period beginning from a starting point of the arc stage and ending at a starting point of the maximum forward feeding period, and an average welding current is defined as an average value of welding current during the short circuit stage and the arc stage, wherein the starting point of the arc stage starts at a moment the wire feeding rate changes from a maximum reverse feeding rate toward zero,
the controller is configured to set, within the first transition period, a current suppression first period during which welding current is made smaller than the average welding current,
the welding current is configured to decrease during the first transition period after the current suppression first period,
when a length of the first transition period is T0 and a length of the current suppression first period is T1, $0 < T1/T0 \leq 0.8$,
the controller is configured to set, immediately before the first transition period, a maximum reverse feeding period during which the wire feeding rate is maintained at the maximum reverse feeding rate, and also set a current suppression preliminary period during which the welding current is made smaller than the average welding current and which is continuous with the current suppression first period,
the maximum reverse feeding period is longer than the current suppression preliminary period, and
the current suppression first period continues at least until the wire feeding rate becomes 0 during the first transition period.

2. The arc welding apparatus according to claim 1, wherein, when T2 is defined as a time length from the starting point of the arc stage till the wire feeding rate assumes 0, $T1/T2 \geq 0.8$.

3. The arc welding apparatus according to claim 1, wherein a starting point of the current suppression first period and a starting point of the first transition period coincide with each other.

4. The arc welding apparatus according to claim 1, wherein, during the current suppression first period, the welding current is 70% or less of the average welding current.

5. The arc welding apparatus according to claim 1, wherein the controller is configured to set a current suppression second period during which the welding current is made smaller than the average welding current, the current suppression second period having a starting point after the starting point of the arc stage and an end point coinciding with an end point of the arc stage.

6. The arc welding apparatus according to claim 5, wherein a length of the current suppression second period is not less than 1% and not more than 30% of a length of the arc stage.

7. The arc welding apparatus according to claim 1, wherein, when a second transition period is defined as a period from when the wire feeding rate reaches the maximum forward feeding rate during the arc stage till the wire feeding rate reaches a maximum reverse feeding rate during the short circuit stage,
the controller is configured to set, within the second transition period, an earlier part during which the welding wire has a first average acceleration that is negative, a later part during which the welding wire has a second average acceleration that is negative, and a moderate part between the earlier part and the later part during which the welding wire has a third average acceleration, an absolute value of the third average acceleration being smaller than both of an absolute value of the first average acceleration and an absolute value of the second average acceleration.

8. The arc welding apparatus according to claim 7, wherein the controller is configured to set the wire feeding rate during the moderate part to a positive value.

9. The arc welding apparatus according to claim 7, wherein the controller is configured to set the wire feeding rate during the moderate part to a constant value.

* * * * *